United States Patent
Chang et al.

(10) Patent No.: US 11,080,461 B2
(45) Date of Patent: *Aug. 3, 2021

(54) METHOD FOR IMPROVED CUT METAL PATTERNING

(71) Applicant: TAIWAN SEMICONDUCTOR MANUFACTURING COMPANY LTD., Hsinchu (TW)

(72) Inventors: Kuang-Ching Chang, Hsinchu (TW); Ting-Wei Chiang, New Taipei (TW); Hui-Zhong Zhuang, Kaohsiung (TW); Jung-Chan Yang, Longtan Township (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,023

(22) Filed: Sep. 21, 2020

(65) Prior Publication Data
US 2021/0004518 A1 Jan. 7, 2021

Related U.S. Application Data

(63) Continuation of application No. 16/549,943, filed on Aug. 23, 2019, now Pat. No. 10,783,313.
(Continued)

(51) Int. Cl.
*G06F 30/398* (2020.01)
*G06F 30/347* (2020.01)
*G06F 30/3947* (2020.01)
*G06F 30/3953* (2020.01)
(Continued)

(52) U.S. Cl.
CPC .......... *G06F 30/398* (2020.01); *G06F 30/347* (2020.01); *G06F 30/392* (2020.01);
(Continued)

(58) Field of Classification Search
CPC .... G06F 30/398; G06F 30/347; G06F 30/392; G06F 30/3947; G06F 30/3953;
(Continued)

(56) References Cited

U.S. PATENT DOCUMENTS 5,278,785 A 1/1994 Hazani
5,440,518 A 8/1995 Hazani
(Continued)

*Primary Examiner* — Phallaka Kik
(74) *Attorney, Agent, or Firm* — Hauptman Ham, LLP

(57) ABSTRACT

A system for preparing an integrated circuit device design includes a memory for storing a plurality of preliminary integrated circuit design files; a processor for retrieving a preliminary integrated circuit design file from the memory; locating vertical abutments between adjacent device cell designs, identifying internal metal cuts on the adjacent device cell designs; determining and evaluating a horizontal spacing between the internal metal cuts a spacing threshold; and if the threshold is note met, shifting one cell horizontally relative to the other cell design by a predetermined distance to define a modified device layout, repeating the determining, evaluating, and shifting operations until the spacing threshold is satisfied; and identifying a next vertical abutment between and repeating the identifying, determining, shifting operations until the spacing threshold has been satisfied for all vertical abutments.

20 Claims, 14 Drawing Sheets

Related U.S. Application Data

(60) Provisional application No. 62/725,184, filed on Aug. 30, 2018.

(51) Int. Cl.
*G06F 30/392* (2020.01)
*H03K 19/00* (2006.01)
*H01L 25/00* (2006.01)
*G06F 111/04* (2020.01)
*H03K 19/018* (2006.01)
*H03K 19/0175* (2006.01)
*H03K 19/0185* (2006.01)
*H03K 17/687* (2006.01)
*H03K 19/17736* (2020.01)

(52) U.S. Cl.
CPC ...... *G06F 30/3947* (2020.01); *G06F 30/3953* (2020.01); *G06F 2111/04* (2020.01); *H01L 25/00* (2013.01); *H03K 17/687* (2013.01); *H03K 19/0175* (2013.01); *H03K 19/01825* (2013.01); *H03K 19/017545* (2013.01); *H03K 19/018557* (2013.01); *H03K 19/17736* (2013.01)

(58) Field of Classification Search
CPC . G06F 2111/04; H01L 25/00; H03K 19/0175; H03K 19/017545; H03K 19/01825; H03K 19/018557; H03K 19/17736; H03K 17/687

USPC .......... 716/135, 122, 123, 129, 130; 703/15; 326/101; 327/595, 603
See application file for complete search history.

(56) References Cited

U.S. PATENT DOCUMENTS

| | | |
|---|---|---|
| 5,659,514 A | 8/1997 | Hazani |
| 5,784,327 A | 7/1998 | Hazani |
| 6,338,972 B1 | 1/2002 | Sudhindranath et al. |
| 7,260,442 B2 | 8/2007 | Hwang et al. |
| 9,256,709 B2 | 2/2016 | Yu et al. |
| 10,783,313 B2 * | 9/2020 | Chang .................. G06F 30/398 |
| 2007/0263428 A1 | 11/2007 | Ishii |
| 2011/0227133 A1 | 9/2011 | Morimoto |
| 2013/0154128 A1 | 1/2013 | Wang et al. |
| 2013/0042217 A1 | 2/2013 | Heng et al. |
| 2014/0040838 A1 | 2/2014 | Liu et al. |
| 2014/0217513 A1 | 8/2014 | Hayashi et al. |
| 2015/0206896 A1 | 7/2015 | Chen |
| 2015/0278429 A1 | 10/2015 | Chang |
| 2016/0380183 A1 | 12/2016 | Chuang et al. |
| 2017/0025185 A1 | 1/2017 | Rawat et al. |
| 2017/0373090 A1 | 12/2017 | Correale, Jr. et al. |
| 2019/0371996 A1 | 12/2019 | Chuang et al. |
| 2020/0105768 A1 | 4/2020 | Liaw |

* cited by examiner

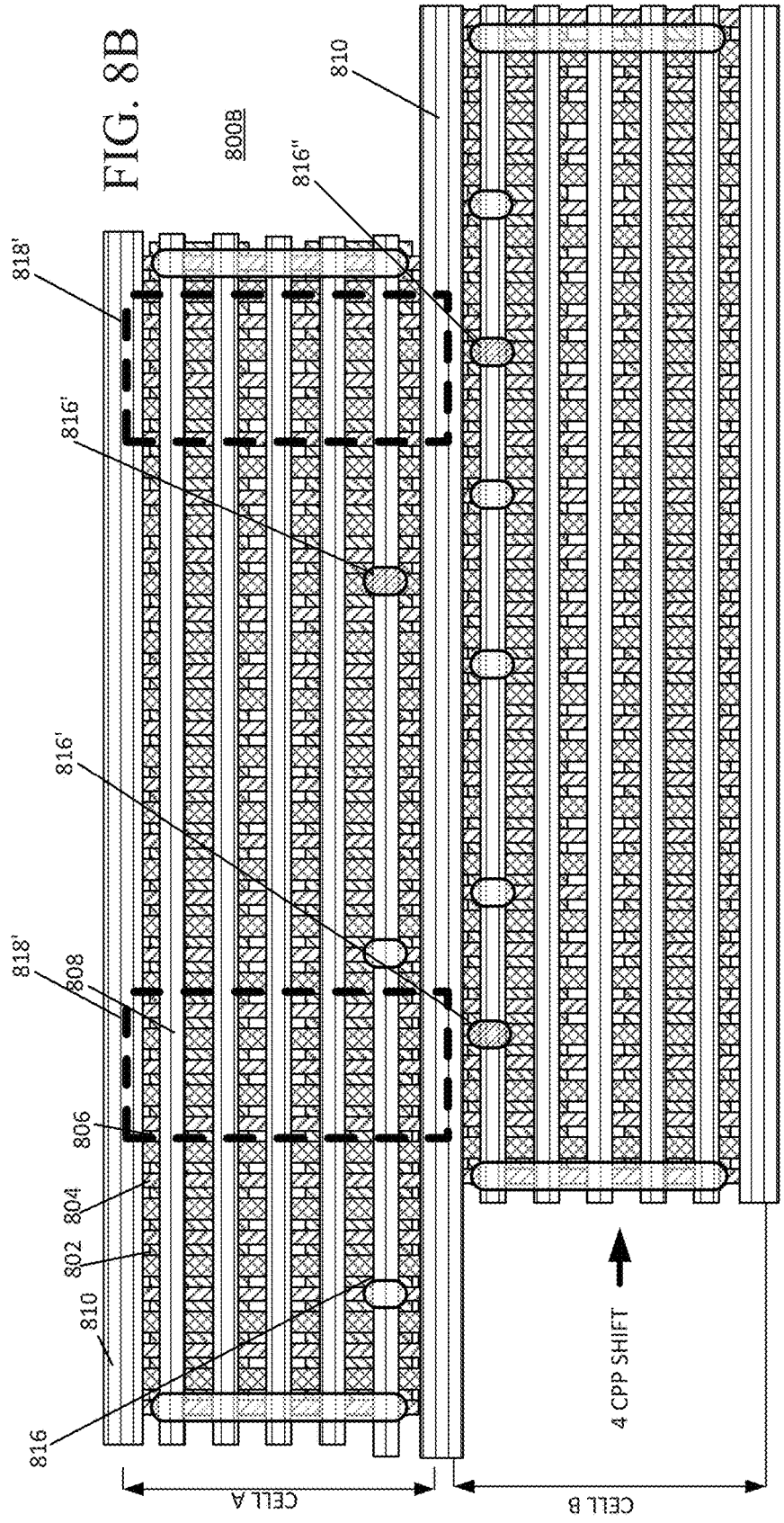
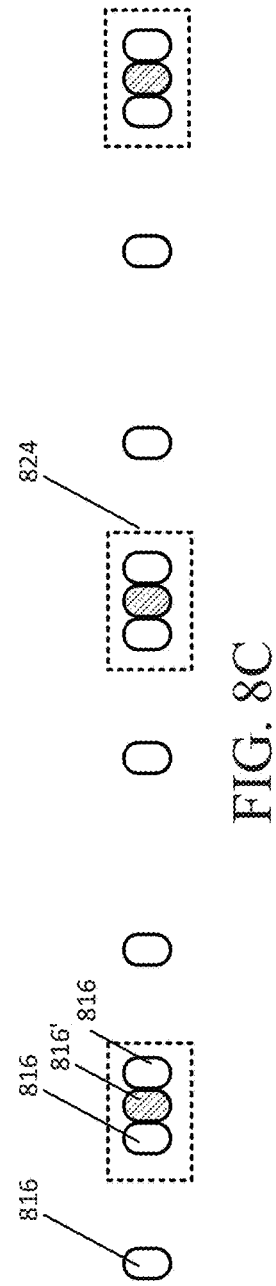
FIG. 8B
FIG. 8C

METHOD FOR IMPROVED CUT METAL PATTERNING

PRIORITY CLAIM

This application is a continuation of U.S. patent application Ser. No. 16/549,943, filed Aug. 23, 2019, which claims the benefit of U.S. Provisional Application No. 62/725,184, filed Aug. 30, 2018, the entireties of which are incorporated by reference herein.

BACKGROUND

The semiconductor integrated circuit (IC) industry has continued to experience rapid growth with technological advances in IC materials and design producing successive generations of ICs, each new generation having smaller geometries and more complex circuits than the previous generation. The complexity of the associated layout, device structures, and manufacturing processes for producing each new generation of ICs has increased correspondingly to achieve the designed functional density.

The performance of advanced patterning and etching processes associated with cut metal patterning are affected by density gradient effects (DGE) and/or landing effects (LE) associated with the specific IC device layout configuration being manufactured. Consideration and adjustment of the relative location and spacing of the cut metal pattern is used to mitigate some of the DGE/LE and improve the uniformity and performance of the resulting ICs.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 8A-8B are top views of an integrated circuit layout in accordance with some embodiments.

FIG. 8C is a diagram of available internal metal zero (M0) cut locations in accordance with some embodiments.

DETAILED DESCRIPTION

Figure 1A:
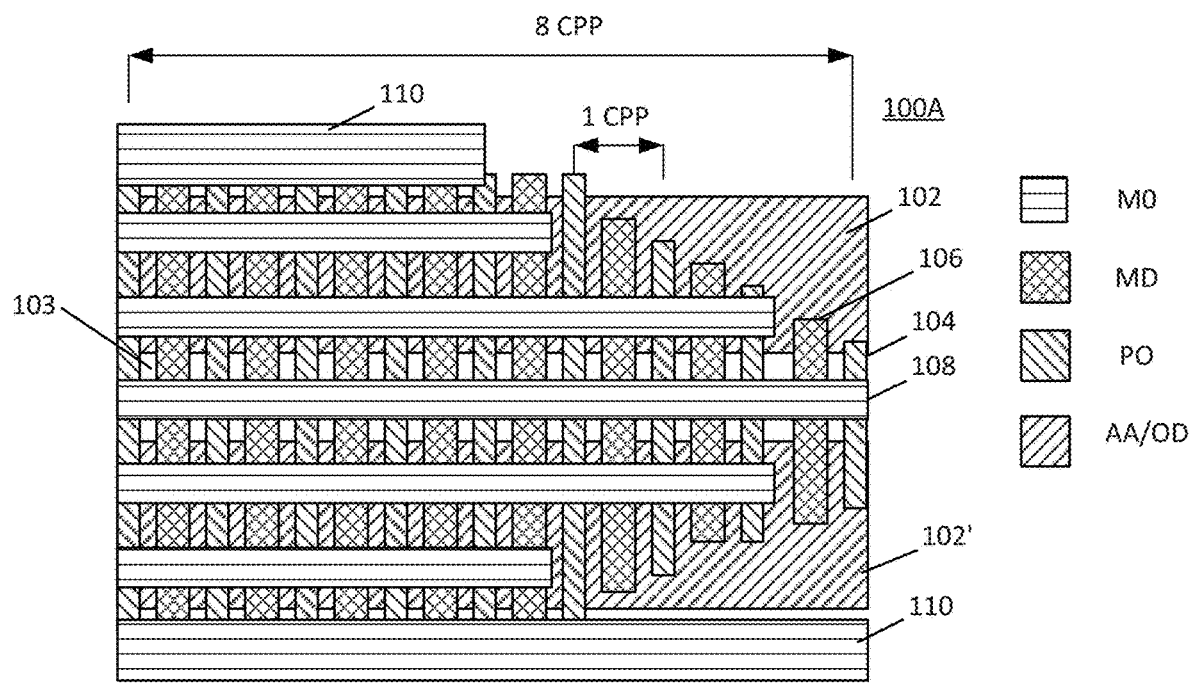
FIG. 1A is a top view of an initial integrated circuit layout cell in accordance with some embodiments.

This description of the exemplary embodiments is intended to be read in connection with the accompanying drawings, which are to be considered part of the entire written description. The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the Figures. The spatially relative terms are intended to encompass different orientations of the device in use or operation in addition to the orientation depicted in the Figures. The apparatus may be otherwise oriented (rotated 90 degrees or at other orientations) and the spatially relative descriptors used herein may likewise be interpreted accordingly.

A method for simplifying chip-level routing and manufacture of semiconductor IC layout designs generated using an electronic design automation (EDA) tool involves forming a regular metal pattern, e.g., a base level metal interconnect pattern (metal zero (M0)), and then selectively cutting (removing) portions of the metal pattern according to the applicable design rules. Metal cuts on the base level metal interconnect pattern (CM0) at the cell boundaries of a standard cell layout (boundary metal cuts) are used to separate/disconnect adjacent standard cells such that each of the separated cells are able to perform independently designated function(s).

In addition to the boundary metal cuts, in some embodiments additional internal metal cuts are made for further adapting the standard cell for its designated function and/or for reducing parasitic capacitances associated with redundant or unused portions of the base level metal interconnect pattern. Both the boundary metal cuts and the internal metal cuts are aligned with either poly/gate electrodes (CM0B/PO) or the source/drain conductors (CM0B/MD). Some embodiments of the present disclosure describe metal cut methods for reducing DGE/LE and/or parasitic capacitance without requiring an additional mask layer and without requiring modification of the internal configuration of the individual standard cells. Some embodiments of the metal cut methods utilize a modified metal-cut mask layer (e.g., a mask layer that exposes those regions of the base level metal interconnect pattern that are to be removed and protects those regions of the base level metal interconnect pattern that are to be preserved in the final IC device. The conductive layers from which the gate electrodes and source/drain conductors are patterned comprise one or more conductive materials including aluminum, copper, cobalt, tungsten, titanium, nickel, gold, platinum, graphene, silicides, salicides, and mixtures and alloys thereof, applied to a substrate singly, in series, and/or in combination. The conductive layer deposition processes include one or more of chemical vapor deposition (CVD) processes, atomic layer deposition (ALD) processes, plasma vapor deposition (PVD) process, electroplating processes, electroless plating processes, and any other suitable application process(es) or combinations thereof.

A standard cell structure includes one or more standard cells from a standard cell library, according to some embodiments. The standard cell is selected from a group comprising AND, OR, XOR, XNOR, NAND, inverter, and other suitable logic devices. In some embodiments, metal cuts (e.g., boundary metal cuts and internal metal cuts) are located on the base level metal interconnect pattern by using a modified metal-cut mask layer. As used herein, the term "boundary metal cuts" refers to metal cuts placed along cell boundaries of standard cells and term "internal metal cuts" refers to metal cuts other than boundary metal cuts performed on the standard cells. Terms "boundary metal cuts" and "internal metal cuts" are simply relative terms and do not indicate any difference in the patterning, developing, and/or etching of the designated metal cuts.

With regard to internal metal cuts designated for use on vertically abutting standard cells, the internal metal cuts exhibit a horizontal separation equal to or greater the contacted polysilicon pitch (CPP) exhibited by the standard cells. The value of the CPP will determined by the applicable design rules and generally corresponds to the gate electrode spacing (or gate pitch (GP), i.e., the center-to-center spacing of adjacent gate electrodes in the active area(s)) utilized within the standard cells that have been configured in compliance with the design rules.

FIG. 1A is a top view of a modified preliminary IC design layout of a standard cell 100A according to some embodiments in which portions of some of the structural elements have been removed to reveal more of the underlying structures and more clearly illustrate the spatial relationships between the various incorporated structures. Standard cell 100A includes active areas/oxide defined (AA/OD) regions 102/102' over which are formed alternating gate electrodes 104 (PO), which define the contacted polysilicon pitch (CPP) for the standard cell, and source/drain conductors 106 (MD). Across the gate electrodes 104 and source/drain conductors 106 are formed a metal level zero (M0) pattern including both internal conductors 108 and common power/ground conductors 110. Standard cell 100A includes five internal conductors 108 and has an overall width of 8 CPP.

Figure 1B:
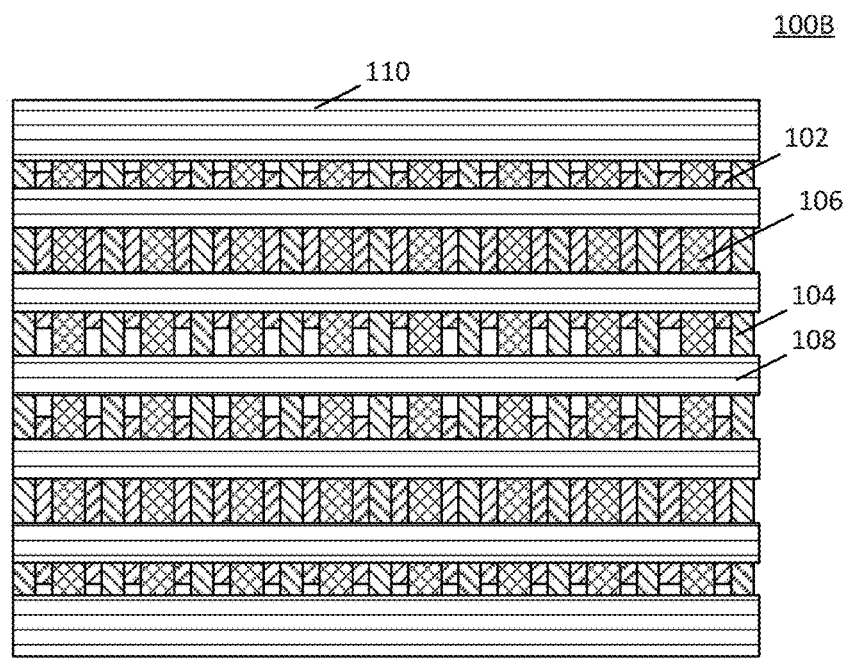
FIG. 1B is a top view of an integrated circuit layout cell in accordance with some embodiments.

FIG. 1B is a top view of a preliminary IC design layout of a standard cell 100B according to some embodiments. Standard cell 100B has an overall width of 8 CPP and includes active areas/oxide defined (AA/OD) regions 102 over which are formed alternating gate electrodes 104 (PO), which define the contacted polysilicon pitch (CPP) for the standard cell and which alternate with source/drain conductors 106 (MD). Across the gate electrodes 104 and source/drain conductors 106 are formed a metal level zero (M0) pattern including both five parallel horizontal internal conductors 108 and upper and lower parallel horizontal common power/ground conductors 110. Standard cell 100B includes five internal conductors 108 and has an overall width of 8 CPP.

Figure 2:
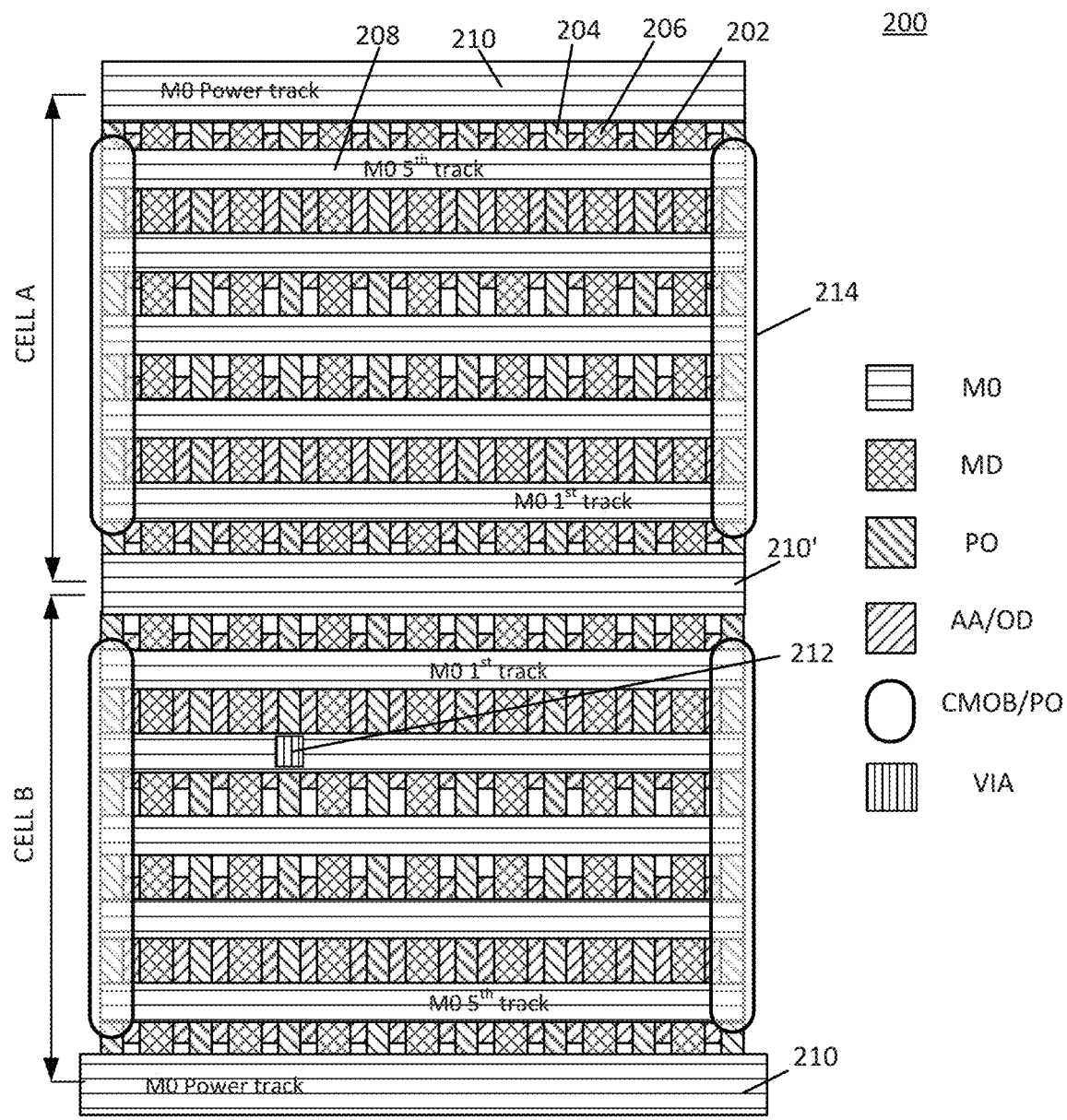
FIG. 2 is a top view of an integrated circuit layout in which two integrated circuit layout cells are arranged in a vertically abutting configuration in accordance with some embodiments.

FIG. 2 is a top view of a preliminary IC design layout 200 according to some embodiments incorporating two standard cells (Cell A, Cell B) that are arranged in a vertically abutting configuration. Both Cell A and Cell B include active areas/oxide defined regions 202 over which are formed alternating gate electrodes 204, and source/drain conductors 206. Across the gate electrodes 204 and source/drain conductors 206 is formed a M0 pattern including both internal conductors 208 and common power/ground conductors 210. The internal conductors 208 are, for convenience, ordered/numbered relative to the common conductor 210' formed along the abutting edges of the standard cells A, B. Preliminary IC design layout 200 also includes boundary metal cut regions 214 aligned with gate conductors 204 (CM0B/PO) for disconnecting the standard cells A, B from horizontally adjacent standard cells and a via 212 arranged for making contact between the second M0 line of standard cell B and an underlying gate electrode.

Figure 3:
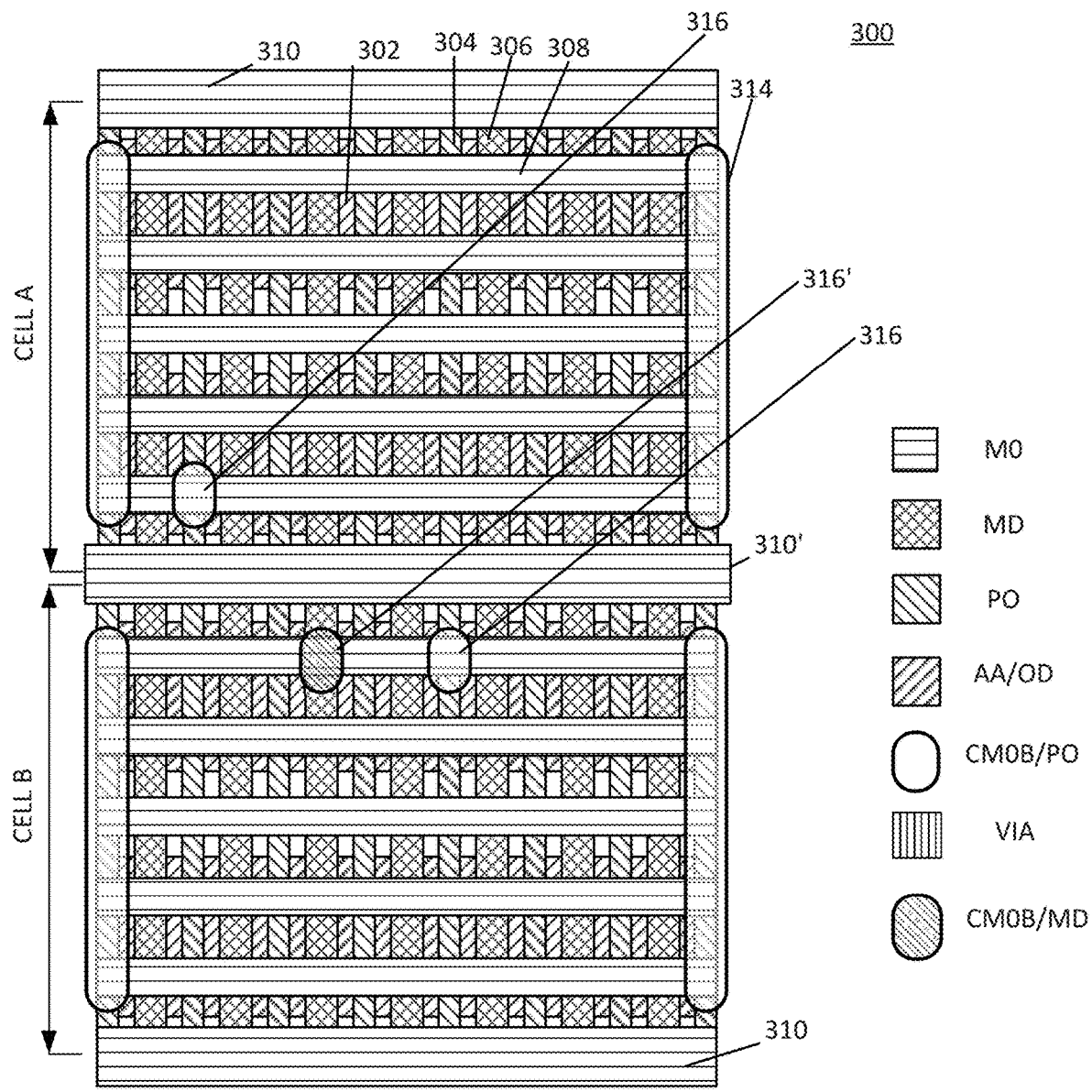
FIG. 3 is a top view of an integrated circuit layout in which two integrated circuit layout cells having various internal cut metal zero (M0) openings are arranged in a vertically abutting configuration in accordance with some embodiments.

FIG. 3 is a top view of a preliminary IC design layout 300 according to some embodiments incorporating two standard cells A, B that are arranged in a vertically abutting configuration. Both Cell A and Cell B include active areas/oxide defined regions 302 over which are formed alternating gate electrodes 304, and source/drain conductors 306. Across the gate electrodes 304 and source/drain conductors 306 is formed a M0 pattern including both internal conductors 308 and common power/ground conductors 310/310'. The internal conductors 308 are, for convenience, ordered/numbered relative to the common conductor 310' formed along the abutting edges of the standard cells A, B. Preliminary IC design layout 300 also includes boundary metal cut regions 314 (CM0B/PO) aligned with gate conductors 304 for disconnecting the standard cells A, B from horizontally adjacent standard cells (not shown). In addition to the boundary metal cut regions, preliminary IC design layout 300 incorporates both internal metal cuts 316 aligned with the gate electrode 304 (CM0B/PO) and internal metal cuts 316' (CM0B/MD) aligned with a source/drain conductor 306.

Figure 4:
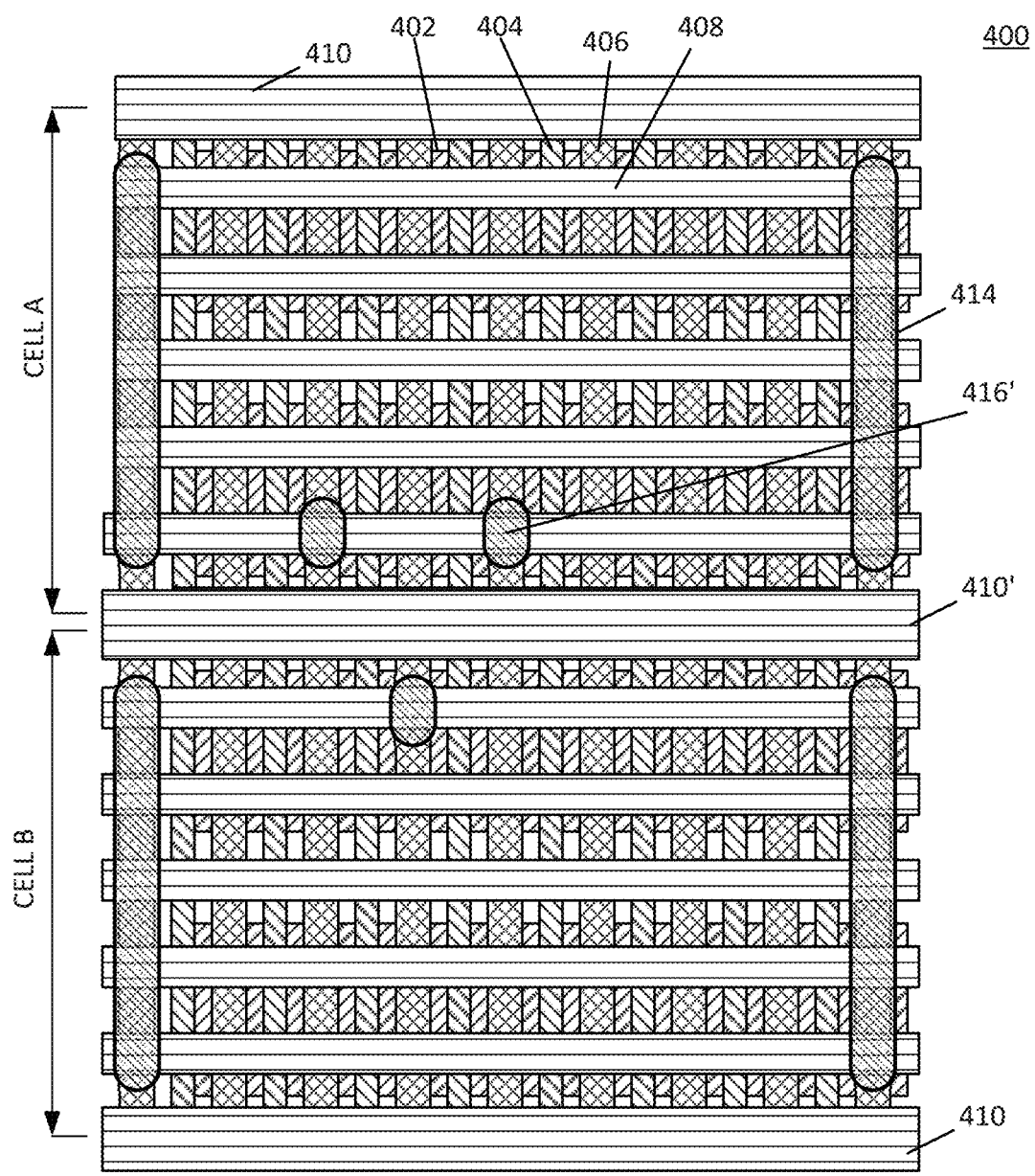
FIG. 4 is a top view of an integrated circuit layout in which two integrated circuit layout cells having various internal cut metal zero (CM0) openings are arranged in a vertically abutting configuration in accordance with some embodiments.

FIG. 4 is a top view of a preliminary IC design layout 400 according to some embodiments incorporating two standard cells A, B that are arranged in a vertically abutting configuration. Both Cell A and Cell B include active areas/oxide defined regions 402 over which are formed alternating gate electrodes 404, and source/drain conductors 406. Across the gate electrodes 404 and source/drain conductors 406 is formed a M0 pattern including both internal conductors 408 and common power/ground conductors 410/410'. The internal conductors 408 are, for convenience, ordered/numbered relative to the common conductor 410' formed along the abutting edges of the standard cells A, B. Preliminary IC design layout 400 also includes boundary metal cut regions 414 (CM0B/MD) aligned with source/drain conductors 406 for disconnecting the standard cells A, B from horizontally adjacent standard cells (not shown). In addition to the boundary metal cut regions, preliminary IC design layout 400 incorporates internal metal cuts 416' aligned with a source/drain conductor 406.

Figures 5A, 5B:
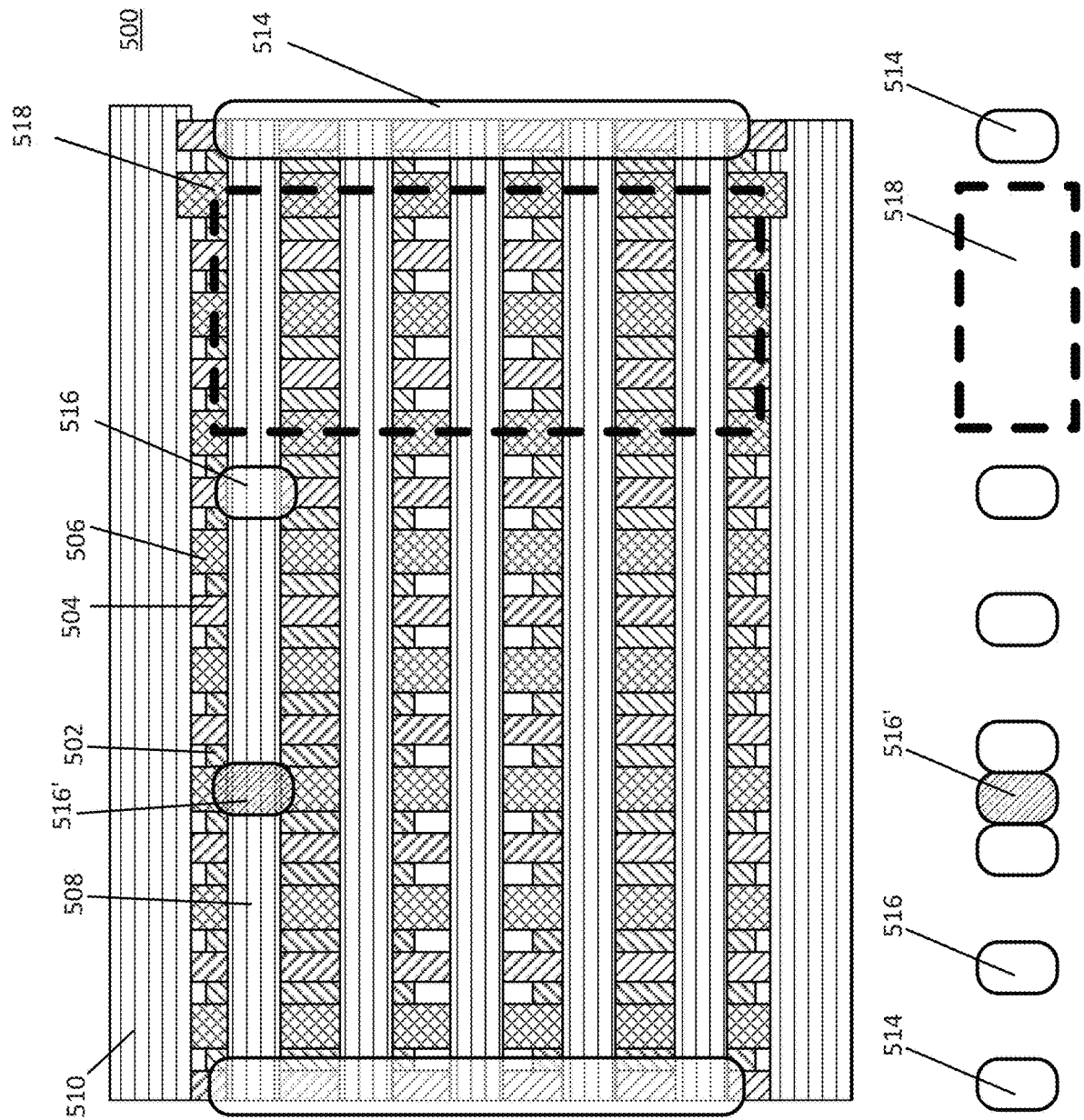
FIG. 5A is a top view of an integrated circuit layout in accordance with some embodiments.
FIG. 5B is a diagram illustrating available metal zero (M0) locations for the cells in accordance with some embodiments of the cell shown in FIG. 5A.

FIG. 5A is a top view of a preliminary IC design layout 500 according to some embodiments comprising a standard cell including active areas/oxide defined regions 502 over which are formed alternating gate electrodes 504, and source/drain conductors 506. Across the gate electrodes 504 and source/drain conductors 506 is formed a M0 pattern including both internal conductors 508 and common power/ground conductors 510. Preliminary IC design layout 500 also includes boundary metal cut regions 514 (CM0B/PO) aligned with gate conductors 504 for disconnecting the standard cell from horizontally adjacent standard cells (not shown). In addition to the boundary metal cut regions, preliminary IC design layout 500 incorporates both internal metal cuts 516 aligned with the gate electrode 504 (CM0B/PO) and internal metal cuts 516' (CM0B/MD) aligned with a source/drain conductor 506.

Preliminary IC design layout 500 also incorporates a safe region (or exclusion region) 518 in which no internal metal cuts 516/516' are permitted. The size and positioning of the safe region 518 within the preliminary IC design layout 500 is configured whereby a predetermined horizontal shift of N CPP between abutting standard cells will resolve horizontal spacing issues between the internal metal cuts 516, 516' of the abutting standard cells. FIG. 5B maps the locations available on preliminary IC design layout 500 for the boundary metal cuts 514, the internal metal cuts 516 (CM0B/PO) aligned with gate conductors 504, and the internal metal cuts 516' (CM0B/MD) aligned with source/drain conductor 506. The internal metal cuts 516 (CM0B/PO) aligned with gate conductors will necessarily be separated by at least 1 CPP as a consequence of the alignment with the gate conductors. Internal metal cuts 516' (CM0B/MD) aligned with source/drain conductors 506, however, are positioned intermediate of the gate conductors and, consequently, will have a horizontal spacing of less than 1 CPP relative to an internal metal cut 516 on either of the adjacent gate conductors on an abutting standard cell. When such an internal cut spacing conflict is detected, shifting (or indexing or repositioning) the lower standard cell horizontally by a predetermined N CPP will reposition the internal metal cut 516' (CM0B/MD) under the safe zone 518 of the upper standard cell, thereby resolving the internal cut spacing conflict.

Figure 6A:
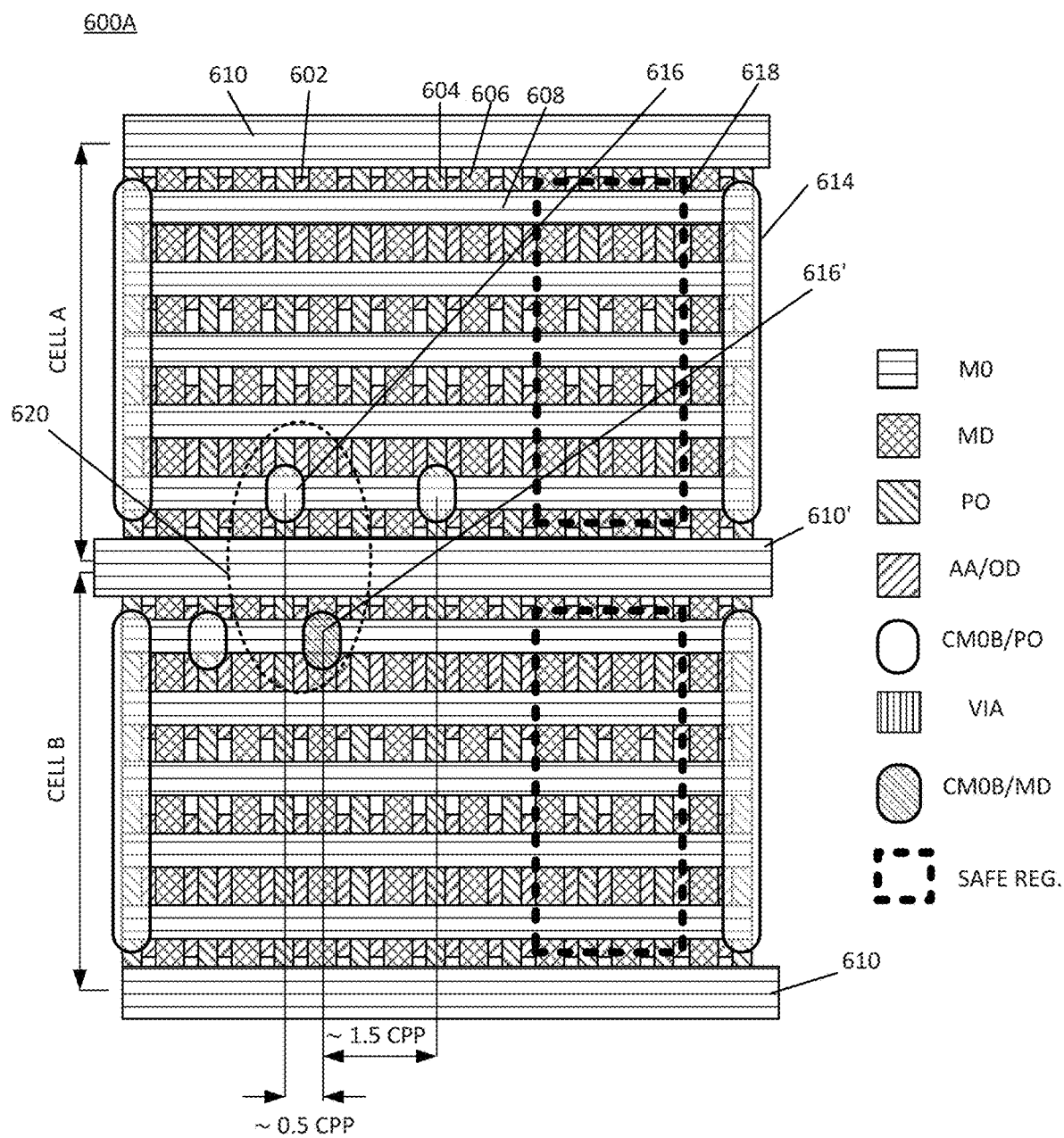
FIGS. 6A-6B are top views of an integrated circuit layout in accordance with some embodiments.

FIG. 6A is a top view of a preliminary IC design layout 600A according to some embodiments incorporating two standard cells A, B that are arranged in a vertically abutting configuration. Both Cell A and Cell B include active areas/oxide defined regions 602 over which are formed alternating gate electrodes 604, and source/drain conductors 606. Across the gate electrodes 604 and source/drain conductors 606 is formed a M0 pattern including both internal conductors 608 and common power/ground conductors 610/610'. The internal conductors 608 are, for convenience, ordered/numbered relative to the common conductor 610' formed along the abutting edges of the standard cells A, B.

Preliminary IC design layout 600A also includes boundary metal cut regions 614 (CM0B/PO) aligned with gate electrodes 604 for disconnecting the standard cells A, B from horizontally adjacent standard cells (not shown). In addition to the boundary metal cut regions, preliminary IC design layout 600A includes both internal metal cuts 616 aligned with the gate electrode 604 (CM0B/PO) and internal metal cuts 616' (CM0B/MD) aligned with the source/drain conductor 606.

Preliminary IC design layout 600A also incorporates a safe region (or exclusion region) 618 in at least one of the standard cells A, B in which no internal metal cuts 616/616' are permitted. The safe region 618 has a vertical dimension that encompasses each of the internal conductors 608 and a horizontal dimension that encompasses at least two of the gate conductors 604 and at least one source/drain conductor 606 positioned between the gate conductors 604. As shown in FIG. 6A, in region 620 includes both an internal metal cut 616 (CM0B/PO) on standard cell A aligned with a third gate electrode 604 and internal metal cut 616' (CM0B/MD) on standard cell B aligned with a third source/drain conductor 606. Because the third source/drain conductor 606 is positioned between the third and fourth gate electrodes, the horizontal spacing between the two internal metal cuts 616, 616' is less than 1 CPP and more on the order of about 0.5 CPP or less. Because horizontal spacings of internal metal cuts of less than about 1 CPP are associated with the generation of DGE/LE which, in turn, tends to lower manufacturing yield and IC device reliability. Accordingly, resolving the inadequate spacing between internal metal cuts 616, 616' shown in region 620 will improve the manufacturability and reliability of the resulting IC devices.

A guideline for the horizontal spacing of the CM0B metal cuts is to maintain a horizontal spacing between metal cuts on adjacent internal conductors 608 of not less than 0.5 CPP and, typically, at least 1.0 CPP, to suppress DGE/LE. As shown in FIG. 6A, however, the CM0B cuts in region 620 violate this guideline and, if uncorrected, would tend to degrade performance of the resulting IC device.

Figure 6B:
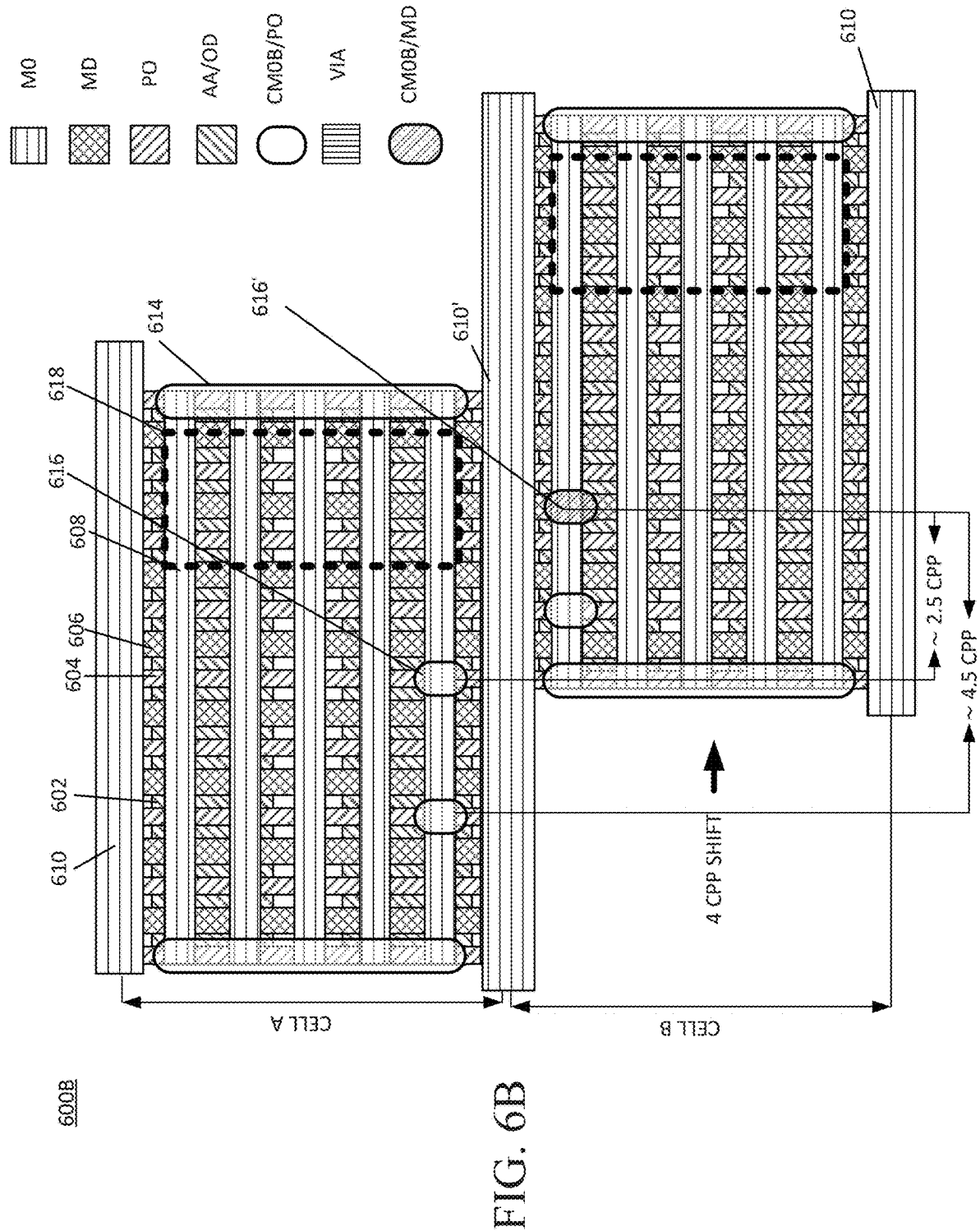

FIG. 6B is a top view of a modified IC design layout 600B according to some embodiments incorporating two standard cells A, B that are arranged in a vertically abutting configuration. Both Cell A and Cell B include active areas/oxide defined regions 602 over which are formed alternating gate electrodes 604, and source/drain conductors 606. Across the gate electrodes 604 and source/drain conductors 606 is formed a M0 pattern including both internal conductors 608 and common power/ground conductors 610/610'. The internal conductors 608 are, for convenience, ordered/numbered relative to the common conductor 610' formed along the abutting edges of the standard cells A, B.

Modified IC design layout 600B also includes boundary metal cut regions 614 (CM0B/PO) aligned with gate electrode 604 for disconnecting the standard cells A, B from horizontally adjacent standard cells (not shown). In addition to the boundary metal cut regions, modified IC design layout 600B includes internal metal cuts 616 aligned with the gate electrode 604 (CM0B/PO) and internal metal cuts 616' (CM0B/MD) aligned with a source/drain conductor 606.

Modified IC design layout 600B also incorporates a safe region (or exclusion region) 618 provided in standard cell A in which no internal metal cuts 616/616' are permitted. As shown in FIG. 6B, however, the horizontal positioning of standard cell B has been modified from the arrangement shown in FIG. 6A by shifting standard cell B to the right by 4 CPP. Because of this realignment of standard cell B with respect to standard cell A, the problematic spacing noted in region 620 of FIG. 6A is resolved with the internal metal cut 616' (CM0B/MD) of standard cell B being repositioned below the safe region of standard cell A. The spacing between the internal metal cut 616 (CM0B/PO) on standard cell A aligned with a third gate electrode 604 and internal metal cut 616' (CM0B/MD) on standard cell B aligned with a third source/drain conductor 606 has been increased from about 0.5 CPP to about 4.5 CPP.

Further, the width of the safe zone is set to ensure that the new spacing between the internal metal cut 616' (CM0B/MD) of cell B and other internal metal cuts 616 (CM0B/PO) on standard cell A aligned with a fourth or fifth gate electrode 604 meets or exceeds the 1 CPP minimum spacing. As shown in FIGS. 6A and 6B, the original spacing between the internal metal cut 616' in region 620 and the second internal metal cut 616 (CM0B/PO) on standard cell A aligned with the fifth gate electrode 604 was acceptable at about 1.5 CPP. After the horizontal shift of standard cell B, the modified spacing is about 2.5 CPP, thereby ensuring that the horizontal shift did not create new horizontal spacing concerns.

Although, as illustrated in FIGS. 6A and 6B, some versions of standard cells may be configured with a width of 8 CPP and a designated safe zone whereby a horizontal shift of 4 CPP resolves any initial horizontal spacing issues between the internal metal cuts 616/616' of abutting standard cells, the method is not so limited. In some embodiments, standard cell having widths of 10 CPP or more are utilized with appropriate combinations of limitations on the placement of internal metal cuts 616' (CM0B/MD) and the corresponding placement of one or more safe zones whereby a predetermined horizontal shift of N CPP resolves any internal metal cut spacing concerns between abutting standard cells.

Figure 7A:
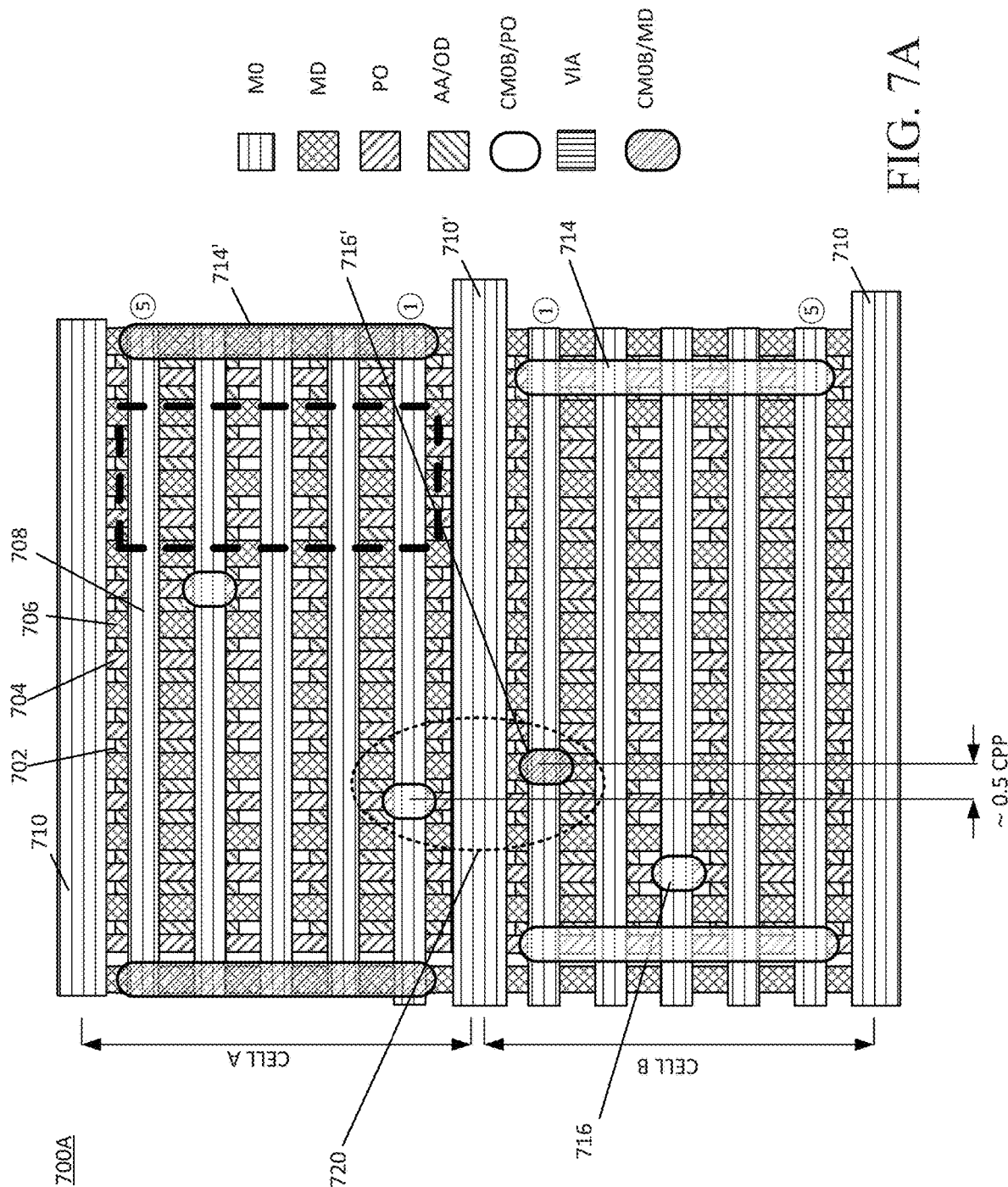
FIGS. 7A-7B are top views of an integrated circuit layout in accordance with some embodiments.

FIG. 7A is a top view of a preliminary IC design layout 700A according to some embodiments incorporating two standard cells A, B that are arranged in a vertically abutting configuration. Both Cell A and Cell B include active areas/oxide defined regions 702 over which are formed alternating gate electrodes 704, and source/drain conductors 706. Across the gate electrodes 704 and source/drain conductors 706 is formed a M0 pattern including both internal conductors 708 and common power/ground conductors 710/710'. The internal conductors 708 are, for convenience, ordered/numbered relative to the common conductor 710' formed along the abutting edges of the standard cells A, B.

Preliminary IC design layout 700A also includes a standard cell A incorporating boundary metal cut regions 714' (CM0B/MD) aligned with source/drain conductors 606 for disconnecting the standard cells A, B from horizontally adjacent standard cells (not shown) and standard cell B incorporating boundary metal cut regions 714 (CM0B/PO) aligned with gate electrodes 704 for disconnecting the standard cells A, B from horizontally adjacent standard cells (not shown). In addition to the boundary metal cut regions, preliminary IC design layout 700A includes both internal metal cuts 716 aligned with the gate electrode 704 (CM0B/PO) and internal metal cuts 716' (CM0B/MD) aligned with a source/drain conductor 706.

Preliminary IC design layout 700A also incorporates a safe region (or exclusion region) 718 in at least one of the standard cells A, B in which no internal metal cuts 716/716' are permitted. The safe region 718 has a vertical dimension that encompasses each of the internal conductors 708 and a horizontal dimension that encompasses at least two of the gate conductors 704 and at least one source/drain conductor 706 positioned between the gate conductors 704. As shown in FIG. 7A, in region 620 an internal metal cut 716 (CM0B/PO) on standard cell A and internal metal cut 716' (CM0B/MD) on standard cell B are positioned within a horizontal spacing of about 0.5 CPP of each other, a horizontal spacing associated with the generation of DGE/LE.

A guideline, according to some embodiments, for the horizontal spacing of the CM0B metal cuts is to maintain a horizontal spacing between metal cuts on adjacent internal conductors 708 of not less than 0.5 CPP and, typically, at least 1.0 CPP, to suppress DGE/LE. As shown in FIG. 7A, however, the CM0B cuts in region 720 violate this guideline and, if uncorrected, would tend to degrade performance of the resulting IC device.

Figure 7B:
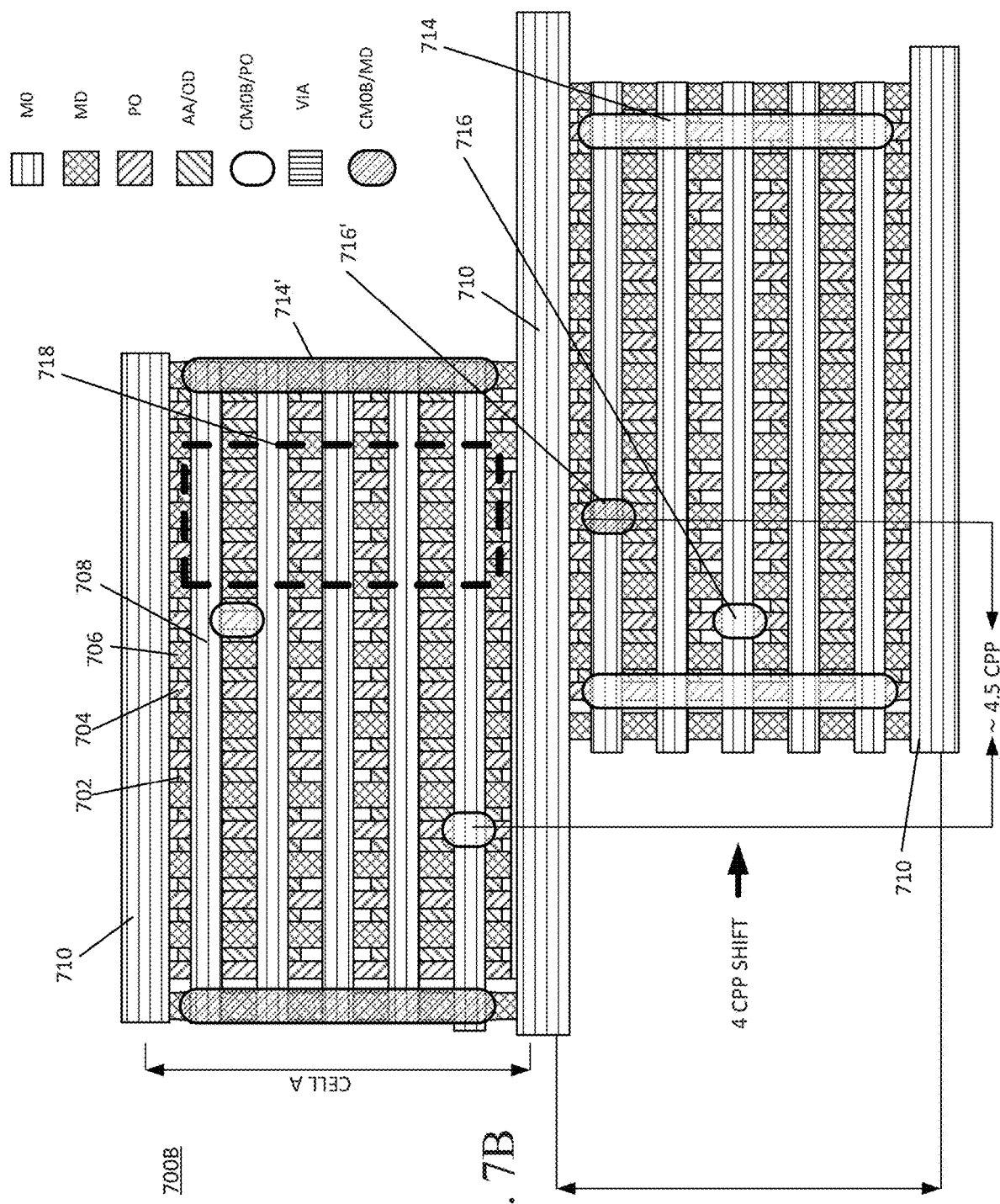

FIG. 7B is a top view of a modified IC design layout 700B according to some embodiments incorporating two standard cells A, B that are arranged in a vertically abutting configuration. As in FIG. 7A, both Cell A and Cell B include active areas/oxide defined regions 702 over which are formed alternating gate electrodes 704, and source/drain conductors 706. Across the gate electrodes 704 and source/drain conductors 706 is formed a M0 pattern including both internal conductors 708 and common power/ground conductors 710/710'. The internal conductors 708 are, for convenience, ordered/numbered relative to the common conductor 710' formed along the abutting edges of the standard cells A, B.

Modified IC design layout 700B also includes boundary metal cut regions 714' (CM0B/MD) aligned with source/drain conductors 706 for disconnecting the standard cell A from horizontally adjacent standard cells (not shown) and boundary metal cut regions 714 (CM0B/PO) aligned with source/drain conductors 706 for disconnecting the standard cell A from horizontally adjacent standard cells (not shown). In addition to the boundary metal cut regions, modified IC design layout 700B includes internal metal cuts 716 aligned with the gate electrode 704 (CM0B/PO) and internal metal cuts 716' (CM0B/MD) aligned with a source/drain conductor 706.

Modified IC design layout 700B also incorporates a safe region (or exclusion region) 718 provided on standard cell A in which no internal metal cuts 716/716' are permitted. As shown in FIG. 7B, however, the horizontal positioning of standard cell B has been modified from the arrangement shown in FIG. 7A by shifting standard cell B to the right by 4 CPP. Because of this realignment of standard cell B with respect to standard cell A, the problematic spacing noted in region 720 of FIG. 7A is resolved with the internal metal cut 716' (CM0B/MD) of standard cell B being repositioned below the safe region 718 of standard cell A.

Figure 8A:
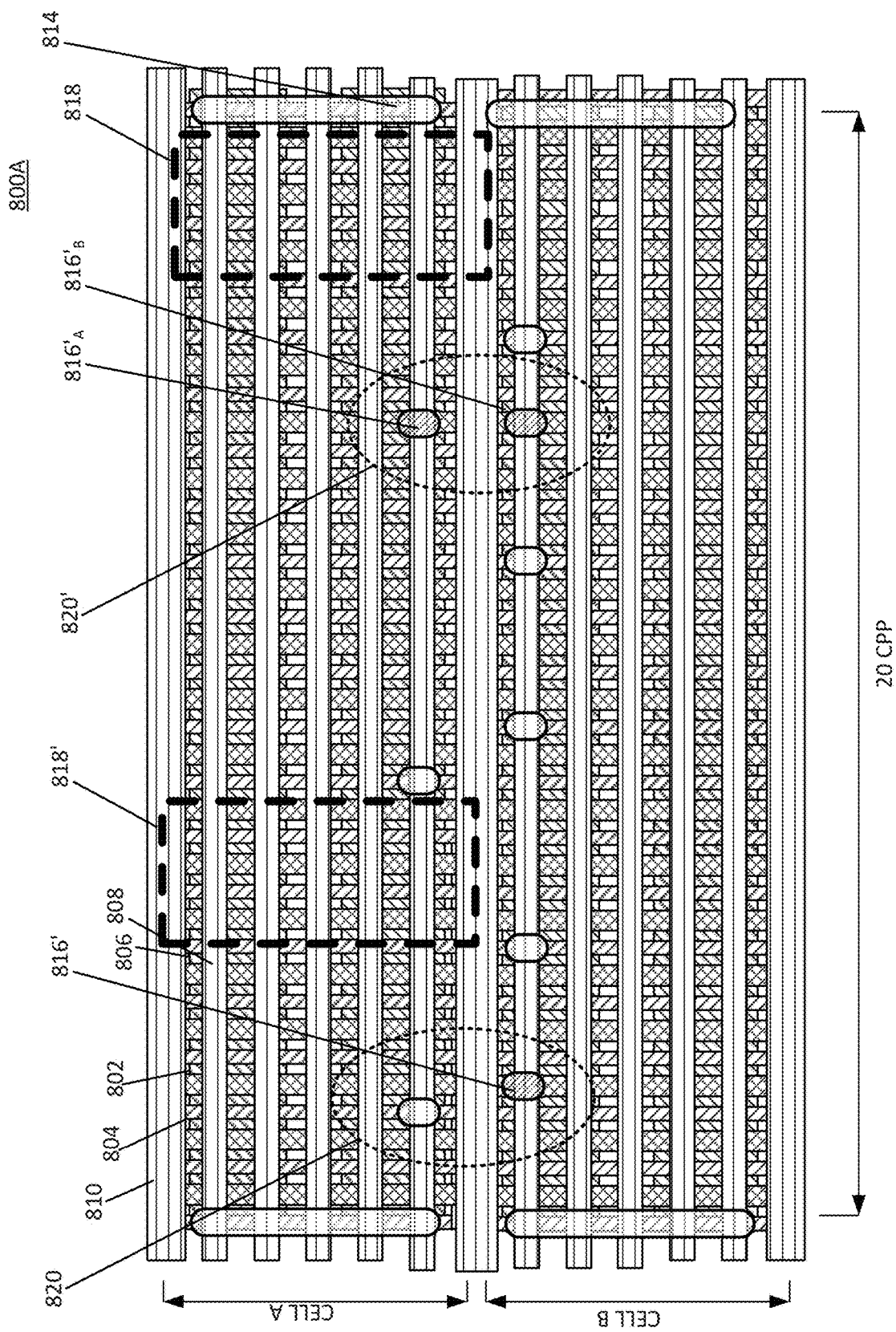

FIG. 8A is a top view of a preliminary IC design layout 800A according to some embodiments incorporating two standard cells A, B that are arranged in a vertically abutting configuration and which have a nominal width of 20 CPP. Both Cell A and Cell B include active areas/oxide defined regions 802 over which are formed alternating gate electrodes 804, and source/drain conductors 806. Across the gate electrodes 804 and source/drain conductors 806 is formed a M0 pattern including both internal conductors 808 and common power/ground conductors 810/810'. The internal conductors 808 are, for convenience, ordered/numbered relative to the common conductor 810' formed along the abutting edges of the standard cells A, B.

Preliminary IC design layout 800A also includes a standard cells A, B incorporating boundary metal cut regions 814 (CM0B/PO) aligned with gate electrodes 804 for disconnecting the standard cells A, B from horizontally adjacent standard cells (not shown). In addition to the boundary metal cut regions, preliminary IC design layout 800A includes both internal metal cuts 816 aligned with the gate electrode 804 (CM0B/PO) and internal metal cuts 816' (CM0B/MD) aligned with a source/drain conductor 806.

Preliminary IC design layout 800A also incorporates a pair of safe regions (or exclusion regions) 818, 818' in at least one of the standard cells A, B in which no internal metal cuts 816/816' are permitted. The safe regions 818, 818' have a vertical dimension that encompasses each of the internal conductors 808 and a horizontal dimension that encompasses at least two of the gate conductors 804 and at least one source/drain conductor 806 positioned between the gate conductors 804. As shown in FIG. 8A, in region 820 an internal metal cut 816 (CM0B/PO) on standard cell A and internal metal cut 816' (CM0B/MD) on standard cell B are positioned within a horizontal spacing of about 0.5 CPP of each other, a horizontal spacing associated with the generation of DGE/LE. Also, in FIG. 8A, in region 820' an internal metal cut 816'A (CM0B/MD) on standard cell A and internal metal cut 816'B (CM0B/MD) on standard cell B are positioned within a horizontal spacing of about 0.5 CPP of each other, a horizontal spacing associated with the generation of DGE/LE.

A guideline for the horizontal spacing of the CM0B metal cuts is to maintain a horizontal spacing between metal cuts on adjacent internal conductors 808 of not less than 0.5 CPP and, typically, at least 1.0 CPP, to suppress DGE/LE. As shown in FIG. 8A, however, the CM0B cuts in regions 820, 820' violate this guideline and, if uncorrected, would tend to degrade performance of the resulting IC device.

FIG. 8B is a top view of a modified IC design layout 800B according to some embodiments incorporating two standard cells A, B that are arranged in a vertically abutting configuration. As in FIG. 8A, both Cell A and Cell B include active areas/oxide defined regions 802 over which are formed alternating gate electrodes 804, and source/drain conductors 806. Across the gate electrodes 804 and source/drain conductors 806 is formed a M0 pattern including both internal conductors 808 and common power/ground conductors 810/810'. The internal conductors 808 are, for convenience, ordered/numbered relative to the common conductor 810' formed along the abutting edges of the standard cells A, B.

Modified IC design layout 800B also includes boundary metal cut regions 814 (CM0B/PO) aligned with source/drain conductors 806 for disconnecting the standard cell A from horizontally adjacent standard cells (not shown). In addition to the boundary metal cut regions, modified IC design layout 800B includes internal metal cuts 816 (CM0B/PO) and internal metal cuts 816', 816'B (CM0B/MD). As shown in FIG. 8B, the horizontal positioning of standard cell B has been modified from the arrangement shown in FIG. 8A by shifting standard cell B to the right to achieve a 4 CPP offset from the original positioning. Because of this repositioning/realignment of standard cell B with respect to standard cell A, the problematic spacing previously noted in regions 820, 820' of FIG. 8A are resolved with the internal metal cuts 816' (CM0B/MD) of standard cell B being repositioned below the safe regions 818, 818' of standard cell A.

Standard cells useful in conjunction with the embodiments of the methods reflected in FIGS. 6A-B, 7A-B, and 8A-B and described above, are improved by predetermining certain aspects of the internal metal cuts, particularly those internal metal cuts (CM0B/MD) which are aligned with a source/drain conductor. Standard cells according to some embodiments have the majority of the internal metal cuts being aligned with a gate electrode (CM0B/PO) and include at least one safe region that is free of all internal metal cuts. Standard cells according to some embodiments will limit the positioning of internal metal cuts (CM0B/MD) which are aligned with a source/drain conductor to a first or last internal conductor and/or constrain the number of such internal metal cuts to a minor portion of the internal metal cuts, e.g., no more than one or two on a standard cell.

In some embodiments, standard cells having a layout reflecting these constraints on the positioning of internal cuts can be configured whereby a standard offset, e.g., 4 CPP, will be sufficient to resolve any spacing issues present in a fully abutted vertical alignment. In some embodiments according to FIG. 8C, standard cells developed by an IC designer will comply with guidelines for locating the internal metal cuts reflecting both fixed (CM0B/PO) positions 816 and groups 824 of available (CM0B/PO)/(CM0B/MD) positions 816, 816' from which one position, i.e., either of the (CM0B/PO) 816 locations or the central 816' (CM0B/MD) location can be selected. According to some embodiments, the standard cells developed according to these guidelines will have a predetermined offset, e.g., N CPP, where N is an integer, that when the second standard cell is indexed by the predetermined offset, will resolve internal metal cut positioning issues involving standard cells configured in accord with the same guidelines.

Figure 9:
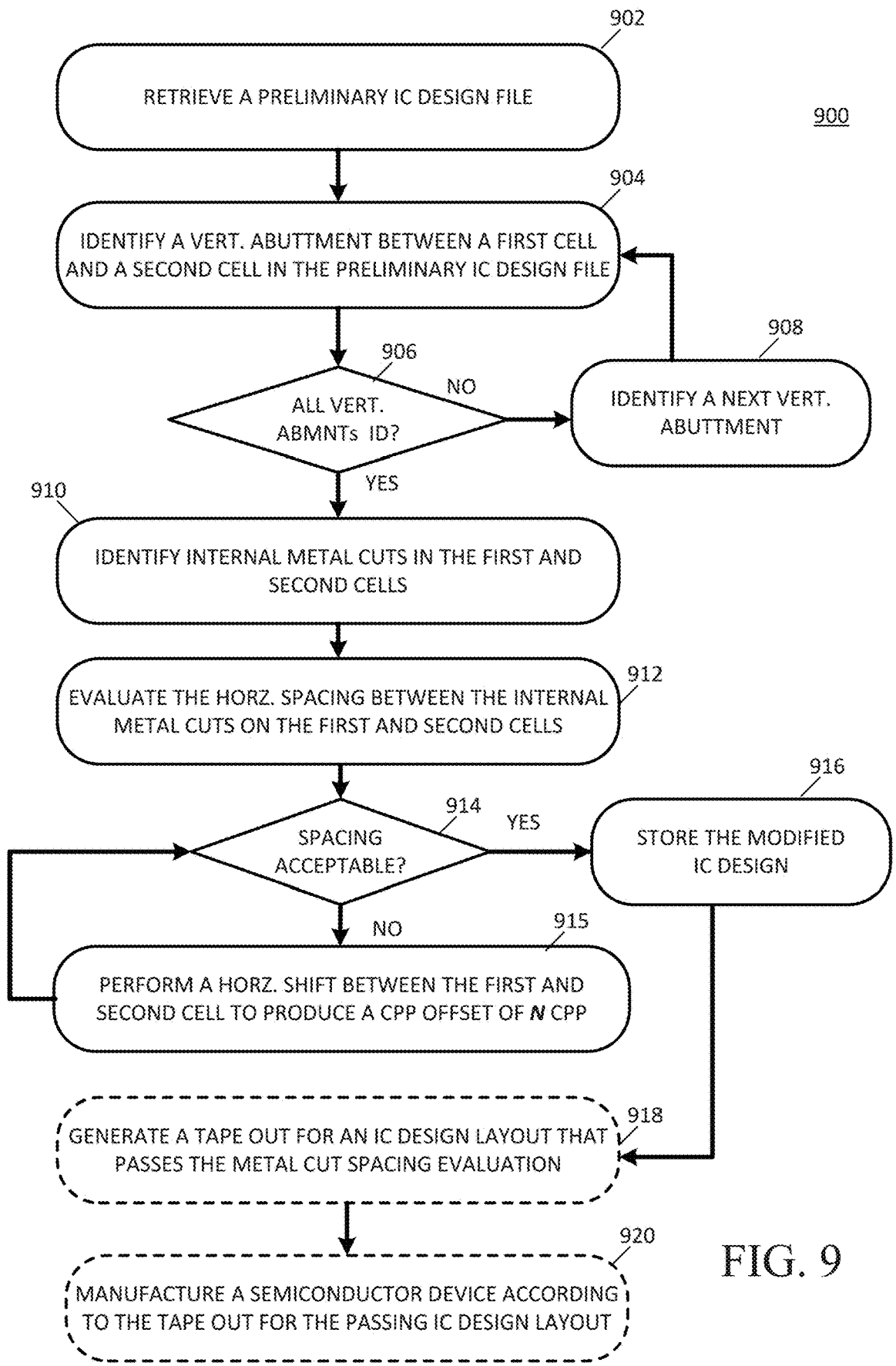
FIG. 9 is a flow diagram of a method for modifying an IC design layout to adjust the spacing between internal metal cuts in accordance with some embodiments.

FIG. 9 illustrates a flow diagram of a method 900 for modifying an IC design layout to adjust the spacing between internal metal cuts according to some embodiments. In some embodiments of method 900 according to FIG. 9, in operation 902, a preliminary IC design file is retrieved for evaluation. Sources from which the preliminary IC design file are retrieved include dedicated design file memory devices and preliminary IC design files that have been stored or uploaded by one or more designers or design teams. In operation 904, the preliminary IC design file is evaluated to identify vertical abutments between standard cells. Operation 906 involves a query regarding the extent to which the vertical abutments have been successfully identified. If fewer than all of the empty areas have been identified, method 900 branches from operation 906 to operation 908 in order to identify the next vertical abutment. When all of the vertical abutments have been identified, method 900 branches to operation 910 for identifying internal metal cuts in the abutting standard cells and then proceeds to operation 912 for evaluating the horizontal spacing between internal metal cuts on the first and second cells.

Operation 914 involves a query regarding whether the identified horizontal spacing between the internal metal cuts on the first and second cells meets the target offset threshold, e.g., at least one CPP. If the spacing fails to meet the target offset threshold, method 900 branches to operation 915 during which a predetermined horizontal shift of N CPP of the first cell relative to the second cell is conducted to generate a modified IC design file. The modified IC design file is then once again evaluated in operation 914. Once all of the identified spacings meet or exceed the target offset threshold, method 900 proceeds to operation 916 in which the modified IC design file is saved.

For those modified IC design layouts that pass the spacing evaluation of operation 914, method 900 includes an optional operation 918, in some embodiments, during which a tape out data file corresponding to the passing modified IC design layout is generated. For those modified IC design layouts for which a tape out data file is generated, the tape out data file will be used to manufacture a semiconductor device according to the passing modified IC design layout in optional operation 920.

Figure 10:
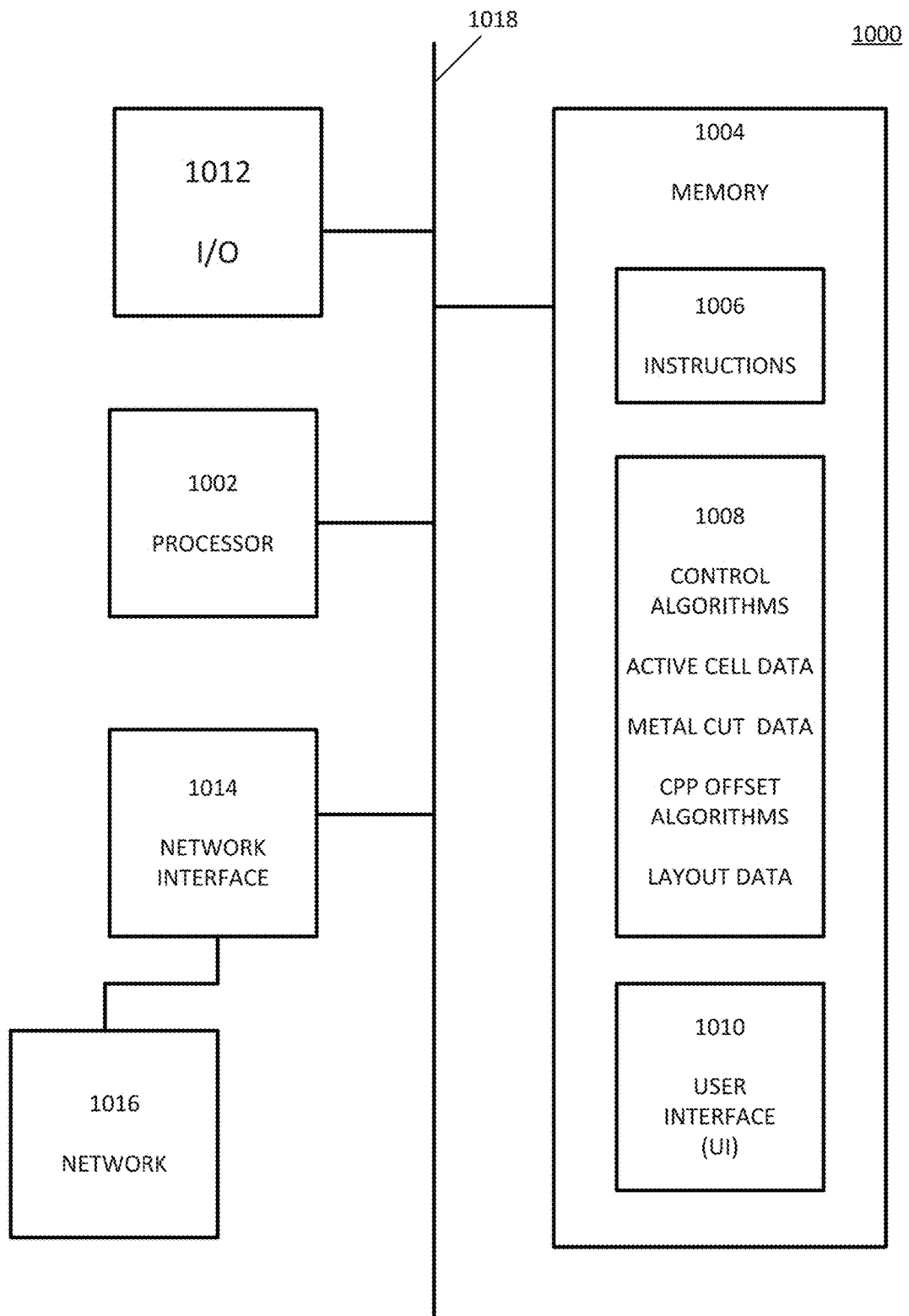
FIG. 10 is a schematic view of an electronic process control (EPC) system useful in the operation of an IC design layout modification in accordance with some embodiments.

FIG. 10 is a block diagram of an electronic process control (EPC) system 1000, in accordance with some embodiments. Methods described herein of generating cell layout diagrams, in accordance with one or more embodiments, are implementable, for example, using EPC system 1000, in accordance with some embodiments. In some embodiments, EPC system 1000 is a general purpose computing device including a hardware processor 1002 and a non-transitory, computer-readable storage medium 1004. Storage medium 1004, amongst other things, is encoded with, i.e., stores, computer program code (or instructions) 1006, i.e., a set of executable instructions. Execution of computer program code 1006 by hardware processor 1002 represents (at least in part) an EPC tool which implements a portion, or all, of the methods described herein in accordance with one or more embodiments (hereinafter, the noted processes and/or methods).

Hardware processor 1002 is electrically coupled to computer-readable storage medium 1004 via a bus 1018. Hardware processor 1002 is also electrically coupled to an I/O interface 1012 by bus 1018. A network interface 1014 is also electrically connected to hardware processor 1002 via bus 1018. Network interface 1014 is connected to a network 1016, so that hardware processor 1002 and computer-readable storage medium 1004 are capable of connecting to external elements via network 1016. Hardware processor 1002 is configured to execute computer program code 1006 encoded in computer-readable storage medium 1004 in order to cause EPC system 1000 to be usable for performing a portion or all of the noted processes and/or methods. In one or more embodiments, hardware processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause EPC system 1000 (where such execution represents (at least in part) the EPC tool) to be usable for performing a portion or all of the noted processes and/or methods. In one or more embodiments, storage medium 1004 also stores information which facilitates performing a portion or all of the noted processes and/or methods. In one or more embodiments, storage medium 1004 stores process control data 1008 including, in some embodiments, control algorithms, active area data, transition cell data, uniformity algorithms, layout data, and constants, target ranges, set points, and code for enabling statistical process control (SPC) and/or model predictive control (MPC) based control of the various processes.

EPC system 1000 includes I/O interface 1012. I/O interface 1012 is coupled to external circuitry. In one or more embodiments, I/O interface 1012 includes a keyboard, keypad, mouse, trackball, trackpad, touchscreen, and/or cursor direction keys for communicating information and commands to hardware processor 1002.

EPC system 1000 also includes network interface 1014 coupled to hardware processor 1002. Network interface 1014 allows EPC system 1000 to communicate with network 1016, to which one or more other computer systems are connected. Network interface 1014 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EPC systems 1000.

EPC system 1000 is configured to receive information through I/O interface 1012. The information received through I/O interface 1012 includes one or more of instructions, data, design rules, process performance histories, target ranges, set points, and/or other parameters for processing by hardware processor 1002. The information is transferred to hardware processor 1002 via bus 1018. EPC system 1000 is configured to receive information related to a user interface (UI) through I/O interface 1012. The information is stored in computer-readable medium 1004 as user interface (UI) 1010.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EPC tool. In some embodiments, a portion or all of the noted processes and/or methods is implemented as a software application that is used by EPC system 1000.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 11:
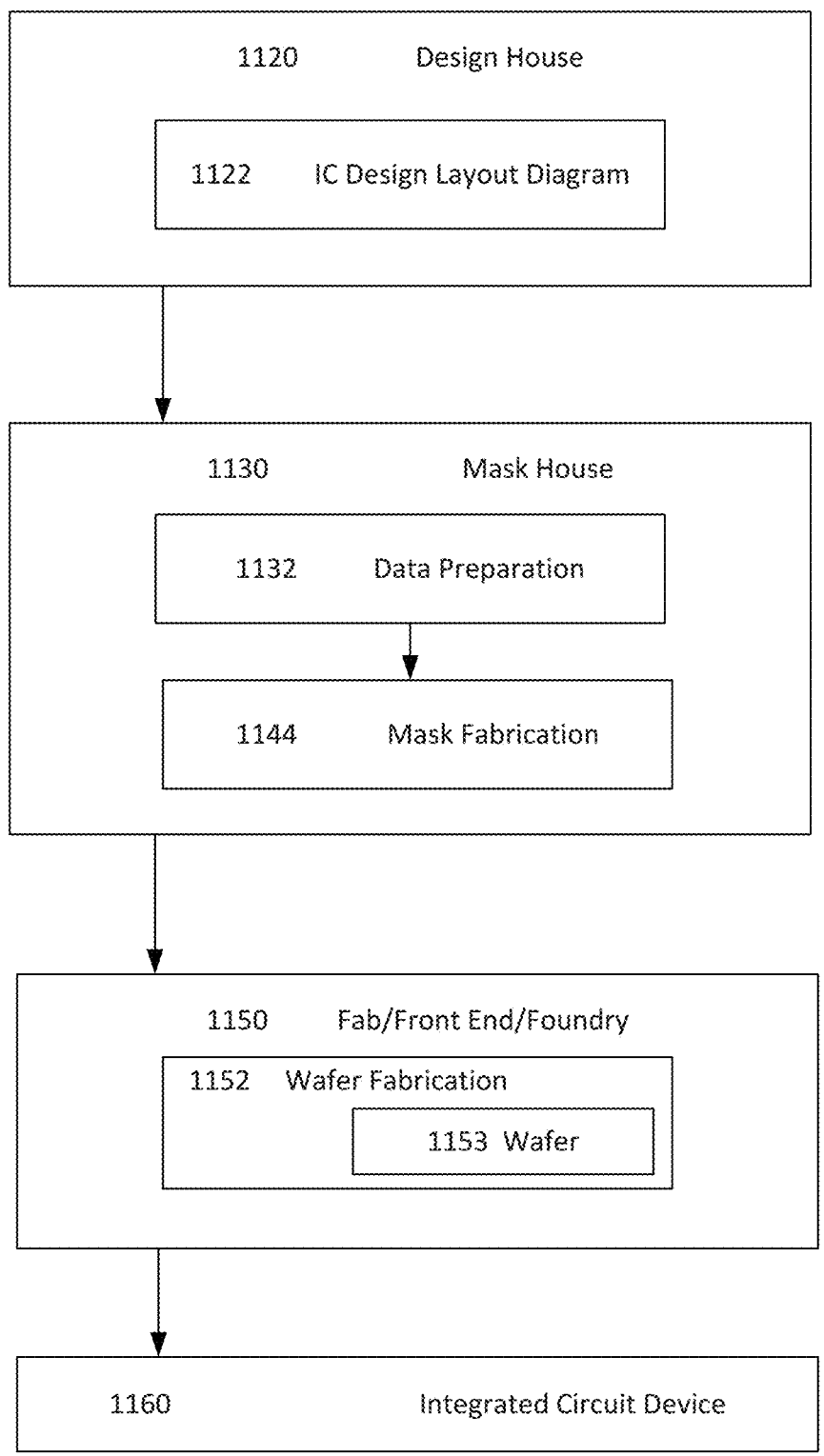
FIG. 11 is a flow diagram of a manufacturing process for an integrated circuit in accordance with some embodiments.

FIG. 11 is a block diagram of an integrated circuit (IC) manufacturing system 1100, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator (FAB or fab) 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an inter-layer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 is be expressed in a GDSII file format or DFII file format, according to some embodiments.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file (RDF). Mask data preparation 1132 provides the RDF to mask fabrication 1144. Mask fabrication 1144 includes a mask writer. A mask writer converts the RDF to an image on a substrate, such as a mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 are collectively referred to as mask data preparation.

In some embodiments, mask data preparation 1132 includes optical proximity correction (OPC) which uses lithography enhancement techniques to compensate for image errors, such as those that arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which undoes part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. In some embodiments, the processing parameters in LPC simulation include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

One of ordinary skill in the art would understand that the above description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 is executed in a variety of different orders, according to some embodiments.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. In some embodiments, mask 1145 is formed in various technologies. In some embodiments, mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask is attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 includes wafer fabrication 1152. IC fab 1150 is an IC fabrication business that includes one or more manufacturing facilities for the fabrication of a variety of different IC products. In some embodiments, IC Fab 1150 is a semiconductor foundry. For example, according to some embodiments, a manufacturing facility for the front end fabrication of a plurality of IC products (front-end-of-line (FEOL) fabrication), while a second manufacturing facility is provided the back end fabrication for the interconnection and packaging of the IC products (back-end-of-line (BEOL) fabrication), and a third manufacturing facility is provided other services for the foundry business.

In some embodiments of the present disclosure, fin dimensional adjustment includes operations associated with making an array of fins across an entirety of the fin-containing functional areas of the integrated circuit, followed by modification of fin dimensions in at least one fin-containing functional area of the integrated circuit. In some embodiments of the present disclosure, the fins of different fin-containing functional areas are formed to a final fin shape or fin dimensional profile separately, in a single fin-formation manufacturing flow for each fin-containing functional area of the IC. In some embodiments, the fin dimension adjustment occurs by forming fins in a layer of fin material, or fin substrate, by applying mask layer to a top surface of the fin material, patterning the mask layer with a pattern that corresponds to the locations of fins in one or more of the fin-containing functional areas, exposing a top surface of the fin material through the mask layer, and etching the fin material to form fins in the fin substrate. In some embodiments, the fins are formed in a single functional area of the IC with a final fin dimension, the selected fin dimension (or, fin height) as described above in operation 1150.

A patterned layer of mask material formed on a semiconductor substrate is made of a mask material that includes one or more layers of photoresist, polyimide, silicon oxide, silicon nitride (e.g., $Si_3N_4$), SiON, SiC, SiOC, or combinations thereof. In some embodiments, masks include a single layer of mask material. In some embodiments, a mask includes multiple layers of mask materials.

In some embodiments, the mask material is patterned by exposure to an illumination source. In some embodiments, the illumination source is an electron beam source. In some embodiments, the illumination source is a lamp that emits light. In some embodiments, the light is ultraviolet light. In some embodiments, the light is visible light. In some embodiments, the light is infrared light. In some embodiments, the illumination source emits a combination of different (UV, visible, and/or infrared) light.

Subsequent to mask patterning operations, fins or areas not covered by the mask, or fins in open areas of the pattern, are etched to modify a fin dimension. In some embodiments, the etching is performed on a top surface of fins with fin sides that are completely covered by adjoining dielectric support material deposited between fins in a previous manufacturing step. Etching of top surfaces of fins is performed with plasma etching, or with a liquid chemical etch solution, according to some embodiments. The chemistry of the liquid chemical etch solution includes one or more of etchants such as citric acid ($C_6H_8O_7$), hydrogen peroxide ($H_2O_2$), nitric acid ($HNO_3$), sulfuric acid ($H_2SO_4$), hydrochloric acid (HCl), acetic acid ($CH_3CO_2H$), hydrofluoric acid (HF), buffered hydrofluoric acid (BHF), phosphoric acid ($H_3PO_4$), ammonium fluoride ($NH_4F$), potassium hydroxide (KOH), ethylenediamine pyrocatechol (EDP), TMAH (tetramethylammonium hydroxide), or a combination thereof. In some embodiments, etching the fins is performed by exposing an upper portion of fin material, extending above a top surface of a dielectric support medium deposited between fins and recessed below a top surface of the fin height in a prior manufacturing step, to a liquid chemical etch solution comprising one or more of the liquid chemical etchants described above. An upper portion of the fin material includes a top surface and sides of the fin material.

In some embodiments, the etching process is a dry-etch or plasma etch process. Plasma etching of a substrate material is performed using halogen-containing reactive gasses excited by an electromagnetic field to dissociate into ions. Reactive or etchant gases include $CF_4$, $SF_6$, $NF_3$, $Cl_2$, $CCl_2F_2$, $SiCl_4$, $BCl_2$, or a combination thereof, although other semiconductor-material etchant gases are also envisioned within the scope of the present disclosure. Ions are accelerated to strike exposed fin material by alternating electromagnetic fields or by fixed bias according to methods of plasma etching that are known in the art.

In some embodiments, etching processes include presenting the exposed portions of fins of the functional area in an oxygen-containing atmosphere to oxidize an outer portion of the fin material, followed by a chemical trimming process such as plasma-etching or liquid chemical etching, as described above, to remove the oxidized semiconductor fin material and leave a modified fin behind. In some embodiments, fin oxidation followed by chemical trimming is performed to provide greater selectivity to the fin material and to reduce a likelihood of accidental fin material removal during a manufacturing process. In some embodiments, the exposed portions of fins of the functional area are top surfaces of the fins, the fins being embedded in a dielectric support medium covering the sides of the fins. In some embodiments, the exposed portions of the fins of the functional area are top surfaces and sides of the fins that are above a top surface of the dielectric support medium, where the top surface of the dielectric support medium has been recessed to a level below the top surface of the fins, but still covering a lower portion of the sides of the fins.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

Details regarding an integrated circuit (IC) manufacturing system (e.g., system 1100 of FIG. 11), and an IC manufacturing flow associated therewith are found, e.g., in U.S. Pat. No. 9,256,709, granted Feb. 9, 2016, U.S. Pre-Grant Pub. No. 20150278429, published Oct. 1, 2015, U.S. Pre-Grant Pub. No. 20140040838, published Feb. 6, 2014, and U.S. Pat. No. 7,260,442, granted Aug. 21, 2007, each of which are hereby incorporated, in their entireties, by reference.

An embodiment of a system for preparing an integrated circuit device includes a first memory configured for storing a plurality of preliminary integrated circuit design files, a processor configured and programmed for retrieving a preliminary integrated circuit design file from the first memory, locating a first vertical abutment between a first (or $m^{th}$) device cell design and a second (or $n^{th}$) device cell design from the preliminary integrated circuit design file, identifying a first internal metal cut in the $m^{th}$ device cell design and a second internal metal cut in the $n^{th}$ device cell design, determining a horizontal spacing between the first and second internal metal cuts, evaluating whether the determined or measured horizontal spacing satisfies a spacing threshold, which may be predetermined, and, if the spacing threshold is not satisfied, shifting the $n^{th}$ cell design horizontally relative to the $m^{th}$ cell design by a distance equal to N contacted polysilicon pitch (CPP) to define a modified device layout, wherein N is an integer of at least 4, repeating the determining, evaluating, and shifting operations until the spacing threshold is satisfied, and identifying a next vertical abutment between an $(m+1)^{th}$ device cell design and an $(n+1)^{th}$ device cell design from the preliminary integrated circuit design file and repeating the identifying, determining, shifting operations until the spacing threshold has been satisfied for all located vertical abutments.

Other embodiments of the system include one or more of a second memory configured for receiving an upload of the modified device layout that satisfies the spacing threshold, an output device arranged and configured to set communicate a fail condition when the modified device layout fails to satisfy the spacing threshold, a processor further configured and programmed for determining a maximum number of modified device layouts to be evaluated before determining that the modified device layout fails to satisfy the spacing threshold, a combined first and second memory, a second processor arranged and configured for retrieving a final modified device layout and generating a tape out, a mask house arranged and configured for receiving a tape out and producing a plurality of masks corresponding to the modified device layout.

An embodiment of a system for preparing an integrated circuit device design includes a first memory configured for storing a plurality of device cell designs, a processor configured and programmed for retrieving a first and second device cell designs from the memory, arranging the first and second device cells in a vertically abutting configuration in an initial device layout, identifying a first internal metal cut in the first device cell design and a first safe region on the first device cell design, identifying a second internal metal cut in the second device cell design, determining a horizontal spacing between the first internal metal cut and the second internal metal cut in the initial device layout, determining whether the horizontal spacing satisfies a spacing threshold, and if the spacing threshold is not satisfied, shifting the second cell design horizontally relative to the first cell design to place the second internal metal cut under the first safe zone and thereby define a modified device layout and then evaluating the modified device layout to ensure that the spacing threshold is satisfied.

Other embodiments of the system include one or more of a processor arranged and configured for identifying a second safe region on the first device cell design, identifying a second internal metal cut in the second device cell design, determining a horizontal spacing between the first internal metal cut and the second internal metal cut in the initial device layout, determining whether the horizontal spacing satisfies a spacing threshold, and, if the spacing threshold is not satisfied, shifting the second cell design horizontally relative to the first cell design to place the second internal metal cut under the first safe zone or the second safe zone and thereby define a modified device layout.

An embodiment of a system for manufacturing an integrated circuit device includes a first memory configured for storing a plurality of device cell designs, a processor configured for retrieving a first device cell design and a second device cell design from the memory, arranging the first and second device cells in a vertically abutting configuration in an initial device layout, identifying a first internal metal cut in the first device cell design, identifying a second internal metal cut in the second device cell design, determining or measuring a horizontal spacing between the first and second internal metal cuts in the initial device layout, determining whether the horizontal spacing satisfies a spacing threshold, and, if the spacing threshold is not satisfied, shifting the second cell design horizontally relative to the first cell design by a distance equal to N contacted polysilicon pitch (CPP) to define a modified device layout, wherein N is an integer that is greater than or equal to 4, and then repeating the determining, evaluating, and shifting operations until the modified device layout satisfies the spacing threshold, a second memory configured for storing the modified device layout, and a mask house configured for retrieving the modified device layout from the second memory and fabricating a plurality of masks corresponding to the modified device layout.

Other embodiments of the system include one or more of a device foundry having a front end of line (FEOL) manufacturing facility arranged and configured using the plurality of masks, in conjunction with doping, deposition, lithography, and etching operations, to manufacture the integrated device, a mask house arranged and configured for providing optical proximity correction (OPC) to at least one of the plurality of masks for improving a patterned image accuracy, providing at least one resolution enhancement techniques (RET) selected from the group consisting of off-axis illumination, sub-resolution assist features, phase-shifting masks to at least one of the plurality of masks for improving a patterned image accuracy, and/or applying an inverse lithography technique to at least one of the plurality of masks for improving a patterned image accuracy, a back end of line (BEOL) manufacturing facility arranged and configured for the testing, interconnection, and packaging of the integrated device, processor incorporated into and comprising a portion of an electronic design automation (EDA) tool, an FEOL manufacturing facility that utilizes an electronic process control (EPC) system, and/or a BEOL manufacturing facility that utilizes an electronic process control (EPC) system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A system for preparing an integrated circuit device design comprising:
 a first memory configured for storing a plurality of preliminary integrated circuit design files;
 a processor configured and programmed for
   retrieving a preliminary integrated circuit design file from the first memory;
   locating a first vertical abutment between an $m^{th}$ device cell design and an $n^{th}$ device cell design from the preliminary integrated circuit design file;
   identifying a first internal metal cut in the $m^{th}$ device cell design and a second internal metal cut in the $n^{th}$ device cell design;
   determining a horizontal spacing between the first internal metal cut and the second internal metal cut;
   evaluating whether the horizontal spacing satisfies a spacing threshold; and
   if the spacing threshold is not satisfied, shifting the $n^{th}$ cell design horizontally relative to the $m^{th}$ cell design by a distance equal to N contacted polysilicon pitch (CPP) to define a modified device layout, wherein N is an integer;
   repeating the determining, evaluating, and shifting operations until the spacing threshold is satisfied; and identifying a next vertical abutment between an (m+1)$^{th}$ device cell design and an (n+1)$^{th}$ device cell design from the preliminary integrated circuit design file and repeating the identifying, determining, shifting operations until the spacing threshold has been satisfied for all located vertical abutments.

2. The system for preparing an integrated circuit device design according to claim 1, further comprising:
a second memory configured for receiving an upload of the modified device layout that satisfies the spacing threshold.

3. The system for preparing an integrated circuit device design according to claim 2, wherein:
the first memory and the second memory are provided in a single memory device.

4. The system for preparing an integrated circuit device design according to claim 1, further comprising:
an output device arranged and configured to set communicate a fail condition when the modified device layout fails to satisfy the spacing threshold.

5. The system for preparing an integrated circuit device design according to claim 1, wherein:
the processor is further configured and programmed for determining a maximum number of modified device layouts to be evaluated before determining that the modified device layout fails to satisfy the spacing threshold.

6. The system according to claim 1, further comprising:
a second processor arranged and configured for retrieving a final modified device layout and generating a tape out.

7. The system according to claim 6, further comprising:
a mask house arranged and configured for receiving the tape out and producing a plurality of masks corresponding to the modified device layout.

8. The system according to claim 1, wherein:
N is at least 4.

9. A system for preparing an integrated circuit device design comprising:
a first memory configured for storing a plurality of device cell designs;
a processor configured and programmed for
retrieving a first device cell design and a second device cell design from the memory;
arranging the first and second device cells in a vertically abutting configuration in an initial device layout;
identifying a first internal metal cut in the first device cell design and a first safe region on the first device cell design;
identifying a second internal metal cut in the second device cell design;
determining a horizontal spacing between the first internal metal cut and the second internal metal cut in the initial device layout;
determining whether the horizontal spacing satisfies a spacing threshold; and
if the spacing threshold is not satisfied, shifting the second cell design horizontally relative to the first cell design to place the second internal metal cut under the first safe zone and thereby define a modified device layout; and
evaluating the modified device layout to ensure that the spacing threshold is satisfied.

10. The system according to claim 9, further comprising:
identifying a second safe region on the first device cell design;
identifying a second internal metal cut in the second device cell design;
determining a horizontal spacing between the first internal metal cut and the second internal metal cut in the initial device layout;
determining whether the horizontal spacing satisfies a spacing threshold; and
if the spacing threshold is not satisfied, shifting the second cell design horizontally relative to the first cell design to place the second internal metal cut under the first safe zone or the second safe zone and thereby define the modified device layout.

11. A system for manufacturing an integrated circuit device comprising:
a first memory configured for storing a plurality of device cell designs;
a processor configured for
retrieving a first device cell design and a second device cell design from the memory;
arranging the first and second device cells in a vertically abutting configuration in an initial device layout;
identifying a first internal metal cut in the first device cell design;
identifying a second internal metal cut in the second device cell design;
determining a horizontal spacing between the first internal metal cut and the second internal metal cut in the initial device layout;
determining whether the horizontal spacing satisfies a spacing threshold; and
if the spacing threshold is not satisfied, shifting the second cell design horizontally relative to the first cell design by a distance equal to N contacted polysilicon pitch (CPP) to define a modified device layout, wherein N is an integer; and
repeating the determining, evaluating, and shifting operations until the modified device layout satisfies the spacing threshold;
a second memory configured for storing the modified device layout;
a mask house configured for retrieving the modified device layout from the second memory and fabricating a plurality of masks corresponding to the modified device layout.

12. The system according to claim 11, wherein:
N is at least 4.

13. The system for manufacturing an integrated circuit device according to claim 11, further comprising:
a device foundry having a front end of line (FEOL) manufacturing facility arranged and configured using the plurality of masks, in conjunction with doping, deposition, lithography, and etching operations, to manufacture the integrated device.

14. The system for manufacturing an integrated circuit device according to claim 13, wherein:
the device foundry further comprises a back end of line (BEOL) manufacturing facility arranged and configured for the testing, interconnection, and packaging of the integrated device.

15. The system for manufacturing an integrated circuit device according to claim 14, wherein:
the BEOL manufacturing facility utilizes an electronic process control (EPC) system.

16. The system for manufacturing an integrated circuit device according to claim 13, wherein:

the FEOL manufacturing facility utilizes an electronic process control (EPC) system.

17. The system for manufacturing an integrated circuit device according to claim 11, wherein:
the mask house is arranged and configured for providing optical proximity correction (OPC) to at least one of the plurality of masks for improving a patterned image accuracy.

18. The system for manufacturing an integrated circuit device according to claim 11, wherein:
the mask house is arranged and configured for providing at least one resolution enhancement techniques (RET) selected from the group consisting of off-axis illumination, sub-resolution assist features, phase-shifting masks to at least one of the plurality of masks for improving a patterned image accuracy.

19. The system for manufacturing an integrated circuit device according to claim 11, wherein:
the mask house is arranged and configured for applying an inverse lithography technique to at least one of the plurality of masks for improving a patterned image accuracy.

20. The system for manufacturing an integrated circuit device according to claim 11, wherein:
processor comprises a portion of an electronic design automation (EDA) tool.

* * * * *